(12) United States Patent
Cho et al.

(10) Patent No.: US 11,397,042 B2
(45) Date of Patent: Jul. 26, 2022

(54) DRAIN HOSE ASSEMBLY AND REFRIGERATOR INCLUDING THE SAME

(71) Applicant: Samsung Electronics Co., Ltd., Suwon-si (KR)

(72) Inventors: Sungmin Cho, Suwon-si (KR); Junwoo Suh, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 187 days.

(21) Appl. No.: 16/717,169

(22) Filed: Dec. 17, 2019

(65) Prior Publication Data

US 2020/0191466 A1    Jun. 18, 2020

(30) Foreign Application Priority Data

Dec. 18, 2018    (KR) .......................... 10-2018-0164533

(51) Int. Cl.
*F25D 21/14*    (2006.01)

(52) U.S. Cl.
CPC ........ *F25D 21/14* (2013.01); *F25D 2321/146* (2013.01); *F25D 2321/1441* (2013.01)

(58) Field of Classification Search
CPC .. F25D 21/14; F25D 17/047; F25D 2321/146; F25D 2321/1441; F16B 7/10; F16B 2/22
See application file for complete search history.

(56) References Cited

U.S. PATENT DOCUMENTS

| | | | |
|---|---|---|---|
| 8,074,463 B2 | 12/2011 | Bang | |
| 9,046,301 B2 | 6/2015 | Park et al. | |
| 9,060,666 B2 | 6/2015 | Jang et al. | |

(Continued)

FOREIGN PATENT DOCUMENTS

| | | | | |
|---|---|---|---|---|
| CN | 102331139 A | | 1/2012 | |
| CN | 107355618 | * | 11/2017 | .............. F16L 33/00 |

(Continued)

OTHER PUBLICATIONS

International Search Report and Written Opinion of the International Searching Authority dated Apr. 17, 2020 in International Patent Application No. PCT/KR2019/017988.

(Continued)

*Primary Examiner* — Cassey D Bauer
(74) *Attorney, Agent, or Firm* — Staas & Halsey LLP

(57) ABSTRACT

A refrigerator includes: an evaporator housing provided behind a storage and including an evaporator for cooling the storage; a machine room disposed below the storage and provided with a discharge plug connected to the evaporator housing; a defrost tray installed in a lower portion of the machine room to collect defrost water discharged through the discharge plug; and a drain hose assembly connecting the discharge plug and the defrost water tray to allow the defrost water to flow toward the defrost water tray. The drain hose assembly includes a drain cap connected to the discharge plug and limiting introduction of external air into the evaporator housing and a drain hose having one end connected to the drain cap and another end connected to the defrost water tray, and a length of the drain hose assembly is adjustable by joining between the drain cap and the drain hose.

20 Claims, 28 Drawing Sheets

(56) References Cited

U.S. PATENT DOCUMENTS

| | | |
|---|---|---|
| 9,212,844 B2 | 12/2015 | Lee et al. |
| 2006/0277934 A1 | 12/2006 | Cho |
| 2010/0244438 A1* | 9/2010 | Johanson ............... F16L 33/30 285/148.21 |
| 2012/0117998 A1 | 5/2012 | Yoo |
| 2012/0131943 A1 | 5/2012 | Shin et al. |

FOREIGN PATENT DOCUMENTS

| | | | |
|---|---|---|---|
| DE | 202006013228 * | 10/2006 | ............ F25D 21/14 |
| DE | 10 2009 004 231 A1 | 7/2009 | |
| JP | 5-47783 | 6/1993 | |
| JP | 2003-74776 | 3/2003 | |
| JP | 2007278591 * | 10/2007 | ....... F25D 2321/146 |
| KR | 20-1998-057686 | 10/1998 | |
| KR | 20-1999-009014 | 3/1999 | |
| KR | 20-1999-0016752 | 5/1999 | |
| KR | 20-1999-0021525 | 6/1999 | |
| KR | 10-1999-0048800 | 7/1999 | |
| KR | 20-1999-0027806 | 7/1999 | |
| KR | 10-2002-0029511 | 4/2002 | |
| KR | 10-0578348 | 5/2006 | |
| KR | 10-0633092 | 10/2006 | |
| KR | 10-0698237 | 3/2007 | |
| KR | 10-0853434 | 8/2008 | |
| KR | 10-2008-0103279 | 11/2008 | |
| KR | 10-0906866 | 7/2009 | |
| KR | 10-2009-0130526 | 12/2009 | |
| KR | 10-2010-0062353 | 6/2010 | |
| KR | 10-1083704 | 11/2011 | |
| KR | 10-2013-0036416 | 4/2013 | |
| KR | 10-2014-0123751 | 10/2014 | |
| KR | 10-1461964 | 11/2014 | |
| KR | 10-1496913 | 3/2015 | |
| KR | 10-1620398 | 5/2016 | |
| KR | 10-2016-0094736 | 8/2016 | |
| KR | 10-1793572 | 11/2017 | |
| RU | 2 434 189 C2 | 11/2011 | |

OTHER PUBLICATIONS

Extended European Search Report dated Sep. 24, 2021, by the European Patent Office for European Patent Application No. 19898223.3 (5 pages).

* cited by examiner

DRAIN HOSE ASSEMBLY AND REFRIGERATOR INCLUDING THE SAME

CROSS-REFERENCE TO RELATED APPLICATION(S)

This application is based on and claims priority under 35 U.S.C. § 119 to Korean Patent Application No. 10-2018-0164533, filed on Dec. 18, 2018, in the Korean Intellectual Property Office, the disclosure of which is incorporated by reference herein in its entirety.

BACKGROUND

1. Field

The disclosure relates to a drain hose assembly for discharging defrost water, and a refrigerator including the same.

2. Description of Related Art

In general, a refrigerator is a device for keeping foods fresh with low-temperature cooling air. More specifically, the refrigerator includes a freezer compartment kept at a temperature equal to or lower than a freezing temperature and a refrigerator compartment kept at a temperature slightly exceeding the freezing temperature.

Foods generally contain moisture, and lose the moisture in case of being stored in the refrigerator for a long period of time. Further, humid air may be introduced into the refrigerator when a user opens and closes a door of the refrigerator.

Such moisture particles are condensed on an evaporator that supplies low-temperature cooling air to a storage of the refrigerator, are slowly frozen, and become frost. The frost formed on the evaporator affects heat exchange performance of the evaporator. Therefore, in general, a defrost heater is installed adjacent to the evaporator in the refrigerator to remove the frost on a predetermined cycle. The frost removed on the predetermined cycle becomes liquid, that is, defrost water, flows along a drain hose, and is collected in an evaporation tray provided in a machine room.

However, the drain hose allows the storage in the refrigerator and the machine room into which external air is introduced to communicate with each other. Therefore, efficiency of the refrigerator may deteriorate due to external air introduced through the drain hose.

In order to solve such a problem, drain hoses with various structures such as Korean Patent No. 10-1793572 which is filed by the applicant and granted have been developed and used.

However, such a drain hose according to the related art has poor assemblability due to a complicated structure thereof, and component cost and assembly cost are high.

In addition, a height of the machine room varies depending on a capacity of the refrigerator, and therefore, in case of the drain hose according to the related art, drain hoses with various lengths need to be prepared to cope with the height difference of the machine room of the refrigerator, which results in difficulty in component management.

SUMMARY

Embodiments of the disclosure overcome the above disadvantages and other disadvantages not described above. Also, the disclosure is not required to overcome the disadvantages described above, and an embodiment of the disclosure may not overcome any of the problems described above.

The disclosure provides a drain hose assembly having a simple structure and an adjustable length, and a refrigerator including the same.

According to an embodiment of the disclosure, a refrigerator including a drain hose assembly includes: an evaporator housing provided behind a storage and in which an evaporator for cooling the storage is installed; a machine room provided at a lower portion of the storage and on which a discharge plug connected to the evaporator housing to discharge defrost water is installed; a defrost tray installed in a lower portion of the machine room and configured to collect the defrost water discharged through the discharge plug; and the drain hose assembly connecting the discharge plug and the defrost water tray to each other to allow the defrost water to flow toward the defrost water tray, wherein the drain hose assembly includes a drain cap connected to the discharge plug and limiting introduction of external air into the evaporator housing, and a drain hose having one end connected to the drain cap and the other end connected to the defrost water tray, and a length of the drain hose assembly is adjustable by joining between the drain cap and the drain hose.

According to an embodiment of the disclosure, a drain hose assembly, which is used in a refrigerator including a storage, a door opening and closing the storage, a machine room on which a discharge plug discharging defrost water formed on an evaporator installed behind the storage is installed, and a defrost water tray installed in a lower portion of the machine room and collecting the defrost water, includes: a drain cap connected to the discharge plug to discharge the defrost water and configured to limit introduction of external air; and a drain hose having one end connected to the drain cap and the other end connected to the defrost water tray, wherein a length of the drain hose assembly is adjustable depending on a height of the machine room by joining between the drain cap and the drain hose.

Additional aspects will be set forth in part in the description which follows and, in part, will be apparent from the description, or may be learned by practice of the presented embodiments.

BRIEF DESCRIPTION OF THE DRAWINGS

The above and other aspects, features, and advantages of particular embodiments of the present disclosure will be more apparent from the following description taken in conjunction with the accompanying drawings, in which.

DETAILED DESCRIPTION

Figure 1:
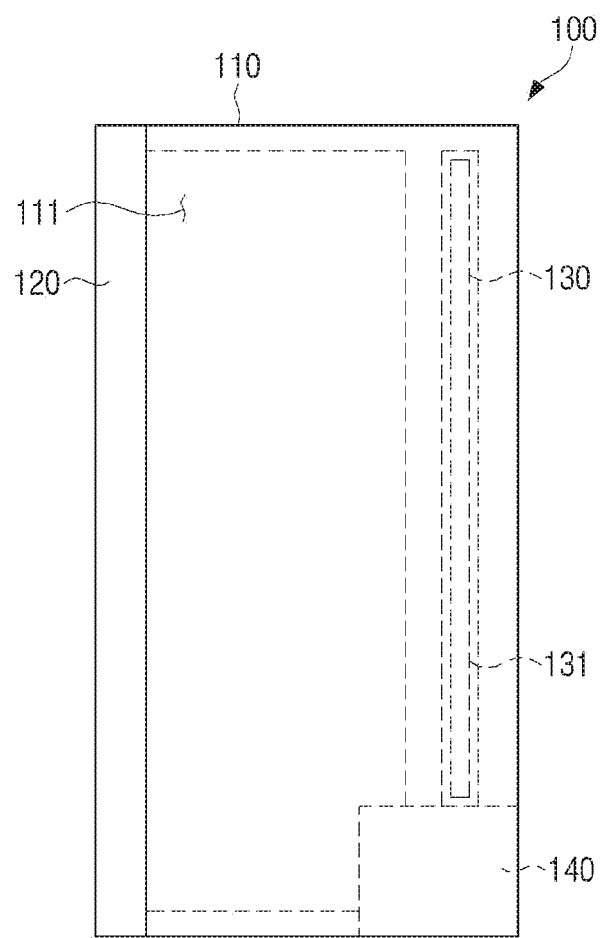
FIG. 1 is a side view illustrating a refrigerator according to an embodiment of the disclosure.

Hereinafter, embodiments of the disclosure will be described in detail with reference to the accompanying drawings.

Various embodiments of the disclosure will hereinafter be described with reference to the accompanying drawings. However, it is to be understood that technologies mentioned in the disclosure are not limited to specific embodiments, but include various modifications, equivalents, and/or alternatives according to embodiments of the disclosure. Throughout the accompanying drawings, similar components will be denoted by similar reference numerals. Further, the accompanying drawings are not illustrated to scale, but sizes of some of components may be exaggerated to assist in the understanding of the disclosure.

In addition, expressions "first", "second", or the like, used in the disclosure may indicate various components regardless of a sequence and/or importance of the components, will be used only to distinguish one component from the other components, and do not limit the corresponding components. For example, a first user device and a second user device may indicate different user devices regardless of a sequence or importance thereof. For example, a first component may be named a second component and the second component may also be similarly named the first component, without departing from the scope of the disclosure.

Terms used in the disclosure may be used only to describe specific embodiments rather than restricting the scope of other embodiments. Singular forms may include plural forms unless the context clearly indicates otherwise. Terms used in the specification including technical and scientific terms have the same meanings as those that are generally understood by those skilled in the art to which the disclosure pertains. Terms defined in a general dictionary among terms used in the disclosure may be interpreted as meanings that are the same as or similar to meanings within a context of the related art, and are not interpreted as ideal or excessively formal meanings unless clearly defined in the disclosure. In some cases, terms may not be interpreted to exclude embodiments of the disclosure even though they are defined in the disclosure.

Hereinafter, a refrigerator including a drain hose assembly according to an embodiment of the disclosure will be described in detail with reference to the accompanying drawings.

Figure 2:
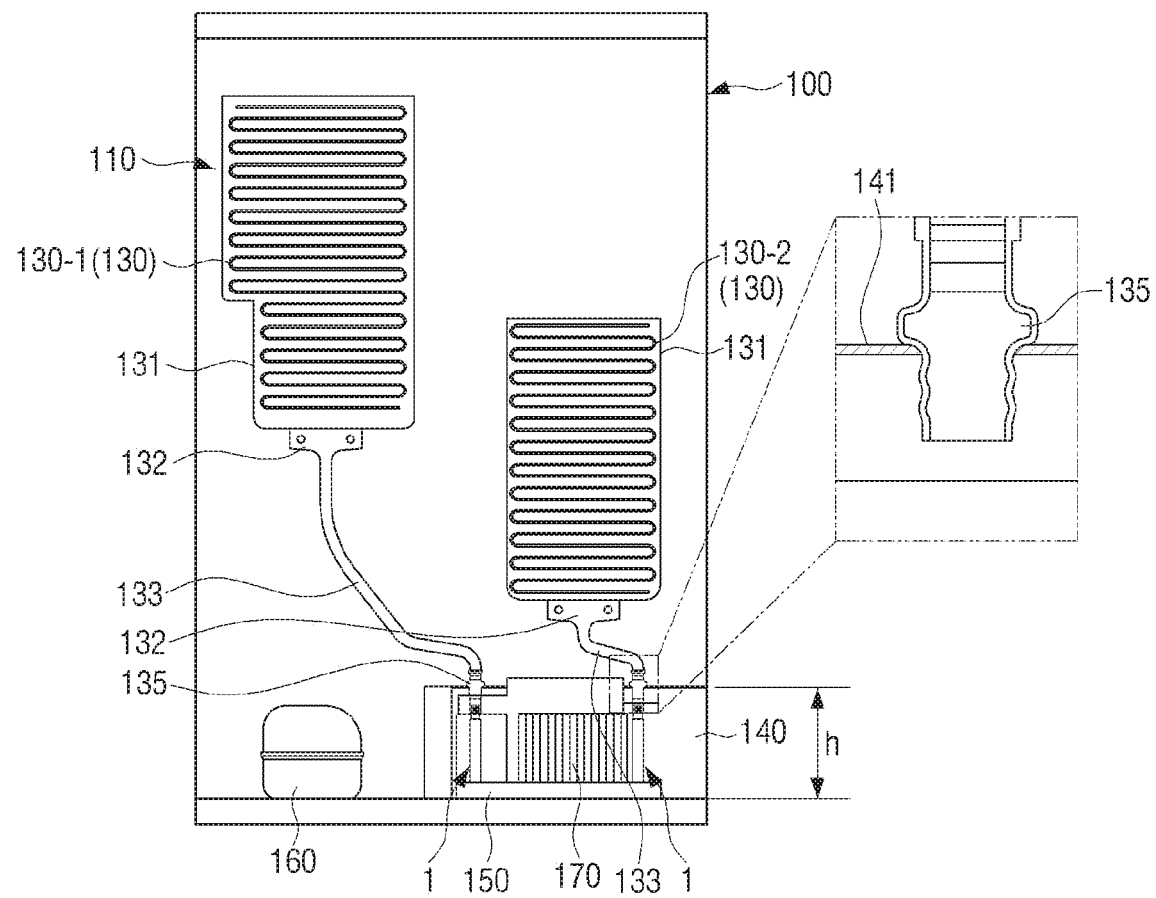
FIG. 2 is a view illustrating an evaporator and a machine room installed in a back portion of the refrigerator of FIG. 1.

FIG. 1 is a side view illustrating a refrigerator according to an embodiment of the disclosure and FIG. 2 is a view illustrating an evaporator and a machine room installed in a back portion of the refrigerator of FIG. 1.

Referring to FIG. 1, a refrigerator 100 according to an embodiment of the disclosure may include a body 110, and a door 120 installed on a front surface of the body 110.

The body 110 forms an appearance of the refrigerator 100 and a storage 111 in which foods are to be stored is provided in the refrigerator 100. The door 120 is rotatably installed on the front surface of the body 110 to open and close the storage 111.

The storage 111 may be partitioned into a freezer compartment and a refrigerator compartment. An evaporator 130 generating cooling air for cooling the storage 111 is installed at the rear of the storage 111, that is, behind the storage 111. An evaporator housing 131 is provided behind the storage 111 to install the evaporator 130. A defrost water collection tank 132 for collecting defrost water formed on the evaporator 130 is provided at a lower end of the evaporator housing 131. The defrost water collection tank 132 may be formed in a funnel-like shape to collect the defrost water and discharge the defrost water downward. The defrost water is formed during a defrost operation for removing frost formed on the evaporator 130.

The evaporator 130 may include a refrigerator compartment evaporator 130-1 generating cooling air that cools the refrigerator compartment and a freezer compartment evaporator 130-2 generating cooling air that cools the freezer compartment. A structure for discharging the formed defrost water is the same in both of the refrigerator evaporator 130-1 and the freezer evaporator 130-2, and thus the refrigerator evaporator 130-1 and the freezer evaporator 130-2 will be collectively referred to as the evaporator 130 hereinbelow. Further, although not illustrated, a refrigerator may include one evaporator, or three or more evaporators.

Referring to FIG. 2, a machine room 140 in which a compressor 160 and a condenser 170 forming a refrigeration cycle are installed may be provided in a lower portion of the body 110.

The machine room 140 is provided at a back-lower portion of the storage 111, and a discharge plug 135 connected to the evaporator housing 131 and discharging the defrost water is provided on an upper surface of the machine room 140. The discharge plug 135 is connected to the defrost water collection tank 132 of the evaporator housing 131 through a defrost water hose 133.

A defrost water tray 150 for collecting the defrost water discharged through the discharge plug 135 is provided in a lower portion of the machine room 140. A drain hose assembly 1 guiding the defrost water is installed between the discharge plug 135 and the defrost water tray 150. Therefore, the defrost water formed on the evaporator 130 is collected in the defrost water tray 150 through the defrost water collection tank 132, the defrost water hose 133, the discharge plug 135, and the drain hose assembly 1.

Hereinafter, the drain hose assembly 1 according to an embodiment of the disclosure will be described in detail with reference to FIGS. 3 to 6.

Figure 3:
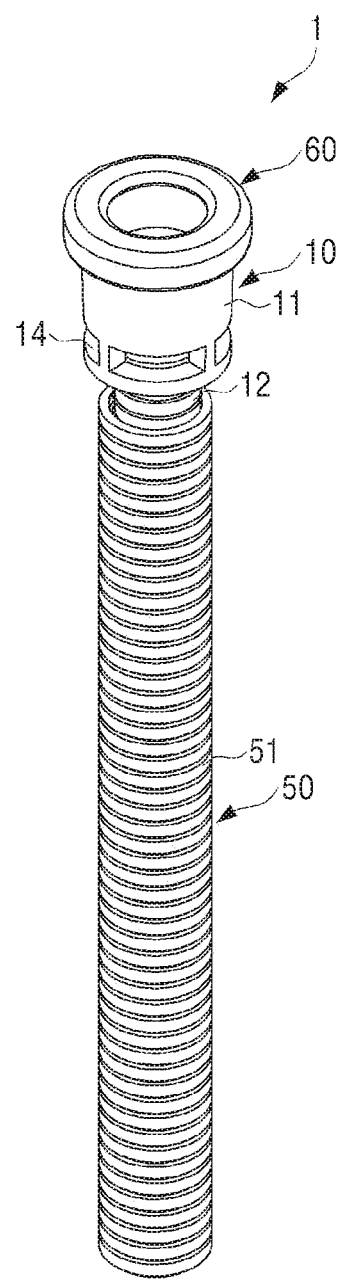
FIG. 3 is a perspective view illustrating a drain hose assembly according to an embodiment of the disclosure.
Figure 4:
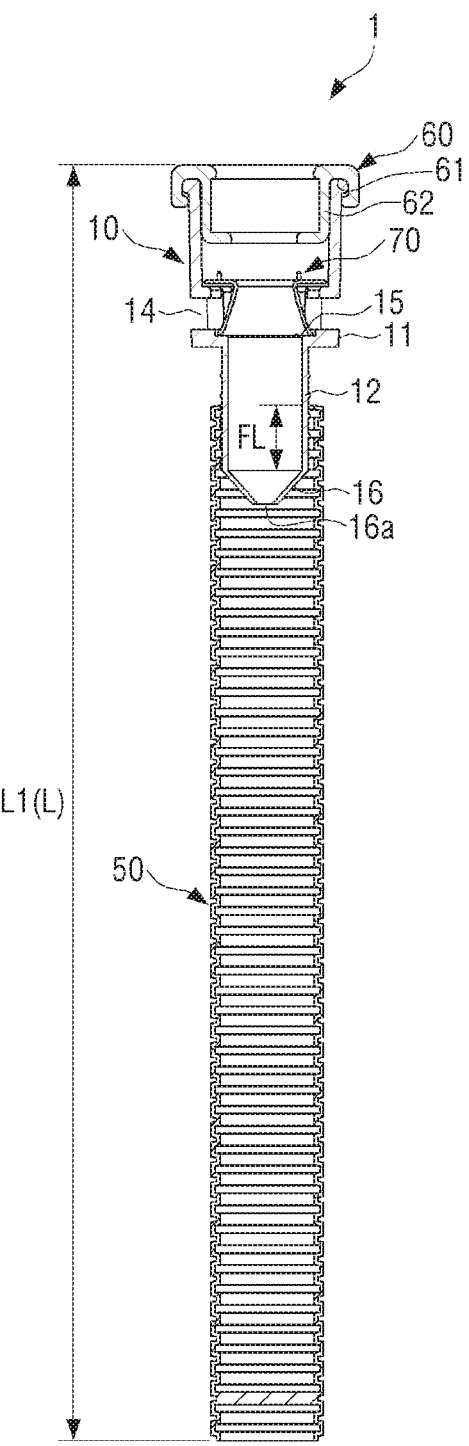
FIG. 4 is a cross-sectional view of the drain hose assembly of FIG. 3.
Figure 5:
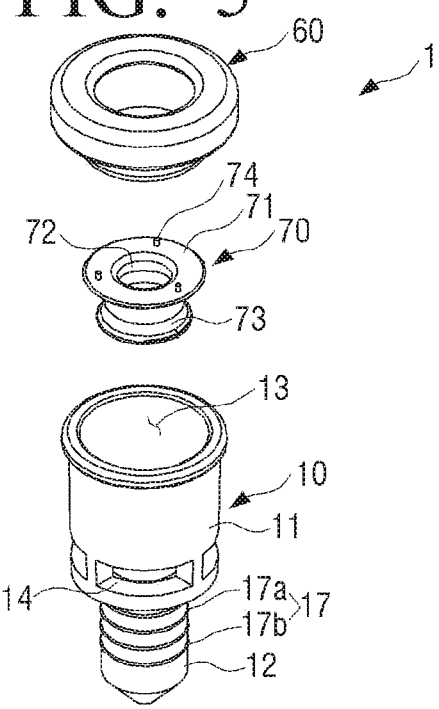
FIG. 5 is an exploded perspective view of the drain hose assembly of FIG. 3.
Figure 5:
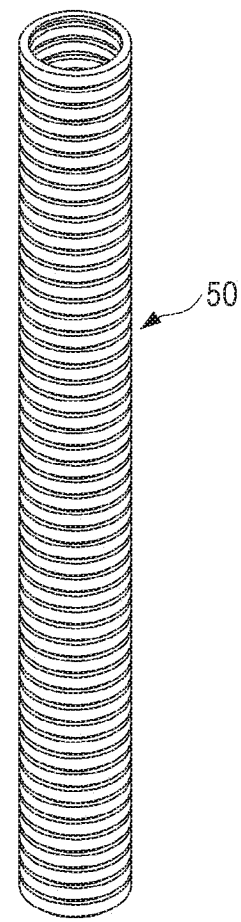
Figure 6:
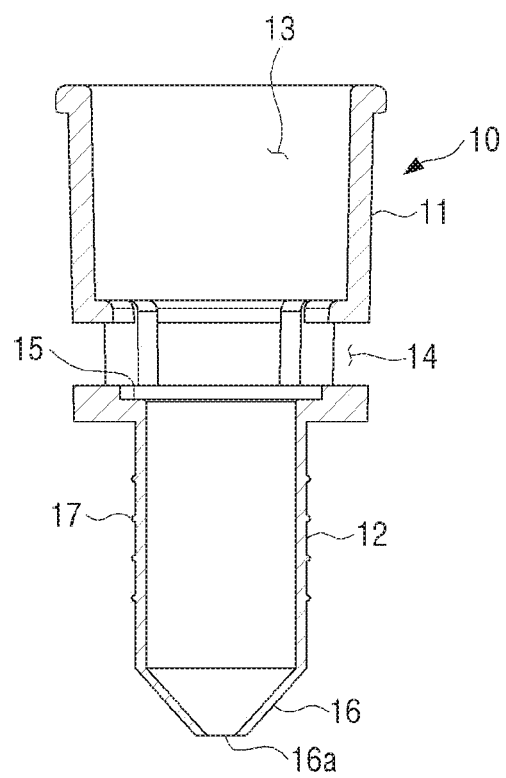
FIG. 6 is a cross-sectional view of a drain cap of the drain hose assembly of FIG. 3.
Figure 7:
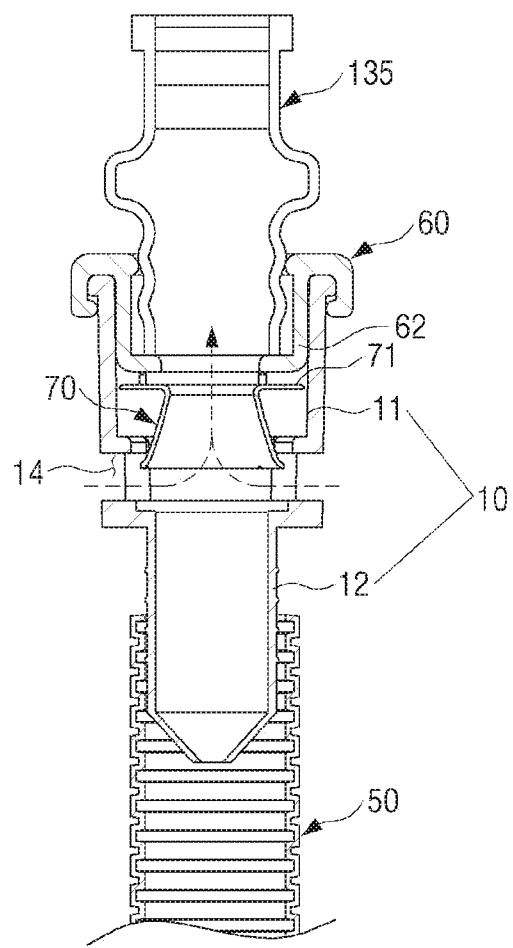
FIG. 7 is a cross-sectional view illustrating a state in which an air adjuster of the drain hose assembly of FIG. 3 is lifted.

FIG. 3 is a perspective view illustrating the drain hose assembly according to an embodiment of the disclosure. FIG. 4 is a cross-sectional view of the drain hose assembly of FIG. 3, and FIG. 5 is an exploded perspective view of the drain hose assembly of FIG. 3. FIG. 6 is a cross-sectional view of a drain cap of the drain hose assembly of FIG. 3. FIG. 7 is a cross-sectional view illustrating a state in which an air adjuster of the drain hose assembly of FIG. 3 is lifted.

Referring to FIGS. 3 to 6, the drain hose assembly 1 according to an embodiment of the disclosure may include a drain cap 10 and a drain hose 50.

The drain cap 10 is connected to the discharge plug 135 provided on the machine room 140 and limits introduction of air in the machine room 140, that is, external air into the evaporator housing 131 through the discharge plug 135. The drain cap 10 may include an upper cap portion 11 having a housing space into which the discharge plug 135 is inserted, and a lower cap portion 12 extending from a lower end of the upper cap portion 11.

The upper cap portion 11 has a hollow cylinder-like shape and the housing space 13 into which the discharge plug 135 may be inserted is formed in the upper cap portion 11. A fixing ring 60 for fixing the drain cap 10 to the discharge plug 135 is installed on an upper end of the upper cap portion 11. The fixing ring 60 is positioned between the upper cap portion 11 and the discharge plug 135, and has a ring shape. The fixing ring 60 may be formed of a rubber material to fix the drain cap 10 to the discharge plug 135 and seal a gap between the drain cap 10 and the discharge plug 135.

A plurality of air holes 14 through which the external air is introduced into the housing space 13 may be formed in an outer circumferential surface of the upper cap portion 11. The plurality of air holes 14 are formed in a lower portion of the upper cap portion 11 that is adjacent to the lower cap portion 12. The plurality of air holes 14 may be formed at predetermined intervals along the outer circumferential surface of the upper cap portion 11.

An air adjuster 70 configured to close the plurality of air holes 14 is installed in the housing space 13 in the upper cap portion 11. A seating portion 15 on which the air adjuster 70 is seated is provided in the lower end of the upper cap portion 11. Accordingly, once the air adjuster 70 is seated on the seating portion 15, the external air may not be introduced into the upper cap portion 11 through the plurality of air holes 14.

The air adjuster 70 is installed to be movable vertically in the housing space 13 of the upper cap portion 11, and may selectively close the plurality of air holes 14 depending on opening and closing of the door 120 installed on a front surface of the storage 111 of the body 110. That is, in a state in which the door 120 is closed, the air adjuster 70 is seated on the seating portion 15 of the upper cap portion 11 to close the plurality of air holes 14. Once the door 120 is open, a negative pressure is formed in the storage 111, and as a result, the air adjuster 70 in the upper cap portion 11 is lifted to open the plurality of air holes 14 as illustrated in FIG. 7. Then, the external air may be introduced into the upper cap portion 11 through the plurality of air holes 14. Once the door 120 is closed again, the air adjuster 70 is lowered and seated on the seating portion 15 of the upper cap portion 11 to close the plurality of air holes 14 as illustrated in FIG. 4.

Referring to FIGS. 4 and 5, the air adjuster 70 includes a lifting plate 71 having a disc shape, and an inclined guide portion 73 extending from a lower portion of the lifting plate 71.

A through-hole 72 through which the defrost water and the external air may pass is formed at the center of the lifting plate 71. A plurality of protrusions 74 may be formed on an upper surface of the lifting plate 71. The inclined guide portion 73 has a hollow truncated cone-like shape, and a diameter of one end of the inclined guide portion 73 that is in contact with the lifting plate 71 is smaller than a diameter of the other end of the inclined guide portion 73. Therefore, a space is formed between the lifting plate 71 and a side surface of the inclined guide portion 73, and thus a part of air introduced through the plurality of air holes 14 when the air adjuster 70 is lifted by the negative pressure in the storage 111 rises along the inclined guide portion 73 to push the lifting plate 71 upward. Accordingly, the air adjuster 70 may be smoothly lifted and the lifted state of the air adjuster 70 may be maintained. Once the door 120 is closed and the negative pressure in the storage 111 thus disappears, the air adjuster 70 is lowered by its own weight and seated on the seating portion 15 of the upper cap portion 11.

Further, a height of the inclined guide portion 73 is larger than a height of each of the plurality of air holes 14, and thus once the air adjuster 70 is seated on the seating portion 15 of the upper cap portion 11, the plurality of air holes 14 are closed by the lifting plate 71 and the inclined guide portion 73. As a result, the external air is not introduced into the upper cap portion 11 through the plurality of air holes 14.

The lifting of the air adjuster 70 is limited by the fixing ring 60 described above. That is, the fixing ring 60 functions as a stopper limiting a lifting height of the air adjuster 70. Therefore, a coupling portion 61 coupled to an upper end of the drain cap 10 is formed at an upper end of the fixing ring 60, and a lower end of an inner ring 62 of the fixing ring 60 inserted into the drain cap 10 becomes a stopper limiting the lifting of the air adjuster 70. Accordingly, the lifting height of the air adjuster 70 may be adjusted by adjusting a length of the inner ring 62 of the fixing ring 60.

The lower cap portion 12 extends from the lower end of the upper cap portion 11 and has a hollow cylindrical shape with an outer diameter smaller than an outer diameter of the upper cap portion 11 to be able to be inserted in the drain hose 50. A lower end 16 of the lower cap portion 12 has a cone-like shape to allow the drain hose 50 to be easily fitted, and a discharge port 16a through which the defrost water is discharged is formed in the lower end 16 of the lower cap portion 12. Therefore, the defrost water passing through the upper cap portion 11 may be discharged to the drain hose 50 through the lower cap portion 12.

A plurality of protrusions 17 for fixing the drain hose 50 to prevent the drain hose 50 from being released are formed on an outer circumferential surface of the lower cap portion 12. Referring to FIG. 5, according to the embodiment, the plurality of protrusions 17 of the lower cap portion 12 include a spiral protrusion 17a formed on an upper portion of the lower cap portion 12, and a plurality of ring protrusions 17b formed on a lower portion of the lower cap portion 12. In case that the plurality of protrusions 17 include the spiral protrusion 17a and the ring protrusions 17b as described above, a length L of the drain hose assembly 1, that is, a length from the upper end of the fixing ring 60 coupled to the upper end of the drain cap 10 to a lower end of the drain hose 50 may be adjusted by adjusting a joining length FL of the drain hose 50 joined to the lower cap portion 12. Here, the joining length FL of the drain hose 50 may refer to a contact length between the drain hose 50 and the lower cap portion 12.

Therefore, in case that the length L of the drain hose assembly 1 needs to be large, one end of the drain hose 50 is positioned on the plurality of ring protrusions 17b at the time of joining to make the joining length FL small. In case that the length L of the drain hose assembly 1 needs to be small, one end of the drain hose 50 passes through the plurality of ring protrusions 17b and is positioned on the spiral protrusion 17a at the time of joining to make the joining length FL large.

Figure 8:
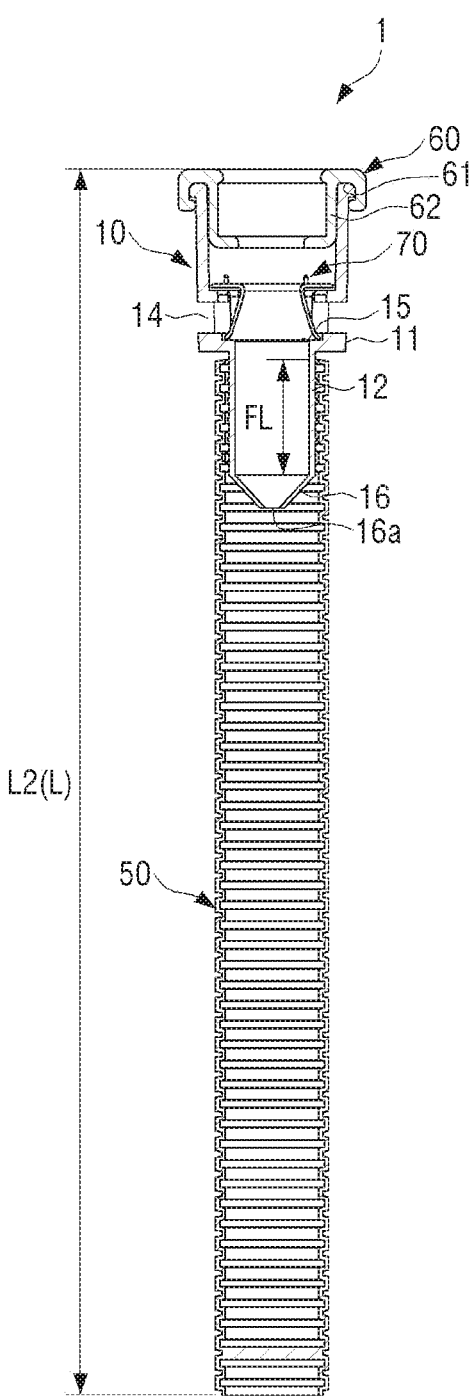
FIG. 8 is a perspective view illustrating a state in which a length of the drain hose assembly according to an embodiment of the disclosure is minimum.

For example, in case that the drain hose 50 is joined by being press-fitted onto the ring protrusions 17b, the length L of the drain hose assembly 1 becomes L1 as illustrated in FIG. 4. However, in case that the drain hose 50 is joined to the spiral protrusion 17a of the lower cap portion 12 and one end of the drain hose 50 thus comes into contact with the lower end of the upper cap portion 11, the length L of the drain hose assembly 1 becomes L2 as illustrated in FIG. 8. L1 is larger than L2 (L1>L2). Therefore, the drain hose assembly 1 according to an embodiment of the disclosure may be installed in two types of refrigerators 100 of which the machine rooms 140 have heights h different from each other. For reference, FIG. 8 is a perspective view illustrating a state in which the length L of the drain hose assembly 1 according to an embodiment of the disclosure is a minimum.

Hereinabove, the case that the spiral protrusion 17a and the plurality of ring protrusions 17b are formed on the outer circumferential surface of the lower cap portion 12 has been described. However, the plurality of protrusions 17 are not limited thereto. All of the plurality of protrusions 17 of the lower cap portion 12 may be the spiral protrusion 17a.

Figure 9:
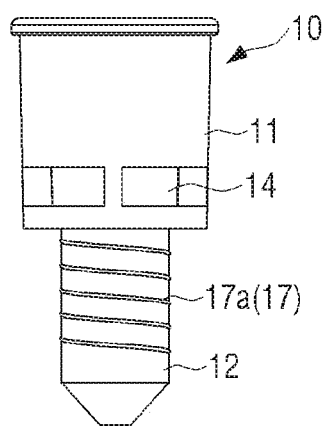
FIG. 9 is a perspective view illustrating an example of the drain cap used in the drain hose assembly according to an embodiment of the disclosure.

FIG. 9 is a perspective view illustrating an example of the drain cap used in the drain hose assembly according to an embodiment of the disclosure.

Referring to FIG. 9, the spiral protrusion 17a is formed on the outer circumferential surface of the lower cap portion 12 along an entire length of the lower cap portion 12 without the plurality of ring protrusions 17b. Therefore, the drain hose 50 may be joined to the lower cap portion 12 by rotating the drain hose 50 along the spiral protrusion 17a of the lower cap portion 12.

Here, the length L of the drain hose assembly 1 may be adjusted by adjusting the joining length FL of the drain hose 50 joined to the lower cap portion 12. That is, the length L of the drain hose assembly 1 may be decreased by increasing the joining length FL of the drain hose 50, and the length L of the drain hose assembly 1 may be increased by decreasing the joining length FL of the drain hose 50. In case that the spiral protrusion 17a is formed along the entire length of the lower cap portion 12, the length L of the drain hose assembly 1 may be variously adjusted to two or more values.

The drain hose 50 connects the drain cap 10 and the defrost water tray 150 to each other. One end of the drain hose 50 is joined to the lower cap portion 12 of the drain cap 10, and the other end of the drain hose 50 is joined to the defrost water tray 150. A joining hole (not illustrated) into which the other end of the drain hose 50 is inserted may be formed in the defrost water tray 150.

Figure 10:
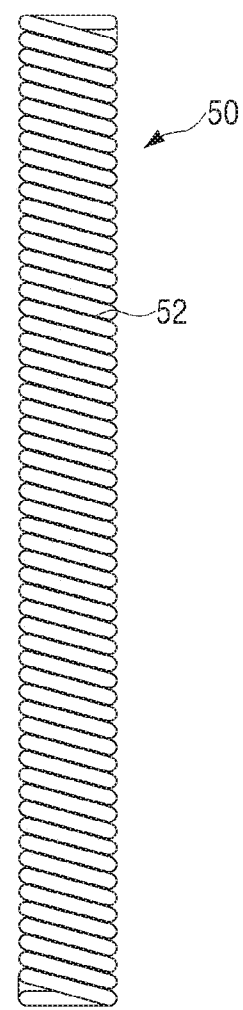
FIG. 10 is a perspective view illustrating an example of a drain hose used in the drain hose assembly according to an embodiment of the disclosure.

The drain hose 50 may be implemented by a corrugated hose having a circular corrugation 51 as illustrated in FIGS. 3 and 5. As an example, the drain hose 50 may be implemented by a corrugated hose having a spiral corrugation 52 as illustrated in FIG. 10.

The drain hose assembly 1 having the above-described structure is installed to connect the discharge plug 135 provided on the upper surface 141 of the machine room 140, and the defrost water tray 150 to each other.

Therefore, once the defrost water is formed on the evaporator 130 due to the defrost operation, the defrost water is introduced into the drain hose assembly 1 through the defrost water collection tank 132, the defrost water hose 133, and the discharge plug 135. The defrost water introduced into the drain hose assembly 1 moves to the lower cap portion 12 through the through-hole 72 of the air adjuster 70 installed in the upper cap portion 11 of the drain cap 10 and is discharged through the discharge port 16a of the lower cap portion 12. The defrost water discharged from the drain cap 10 flows along the drain hose 50 and is collected in the defrost water tray 150.

Further, once the user opens the door 120 of the refrigerator 100, a negative pressure is formed in the storage 111, and as a result, the air adjuster 70 seated on the seating portion 15 in the drain cap 10 is lifted. Here, the lifting of the air adjuster 70 is limited by the fixing ring 60. Once the air adjuster 70 is lifted and comes into contact with the lower end of the inner ring 62 of the fixing ring 60, the external air is introduced into the drain cap 10 through the plurality of air holes 14 formed in the outer circumferential surface of the drain cap 10. Here, a part of the external air introduced through the plurality of air holes 14 moves along the inclined guide portion 73 of the air adjuster 70 and pressurizes the lifting plate 71 of the air adjuster 70. As a result, the lifted state of the air adjuster 70 may be stably maintained.

The external air introduced into the drain cap 10 is introduced into the storage 111 through the through-hole 72 of the air adjuster 70. As a result, the user may smoothly open the door 120, because a force required to open the door 120 is reduced.

Once the door 120 is closed, the air adjuster 70 in the drain cap 10 is lowered by its own weight and seated on the seating portion 15. Once the air adjuster 70 is seated on the seating portion 15 of the drain cap 10, the plurality of air holes 14 of the drain cap 10 is closed by the air adjuster 70 and the external air is thus not introduced into the drain cap 10. As a result, a decrease in efficiency of the refrigerator 100 due to the external air may be prevented.

Hereinafter, a drain hose assembly according to an embodiment of the disclosure will be described in detail with reference to FIGS. 11 to 15.

Figure 11:
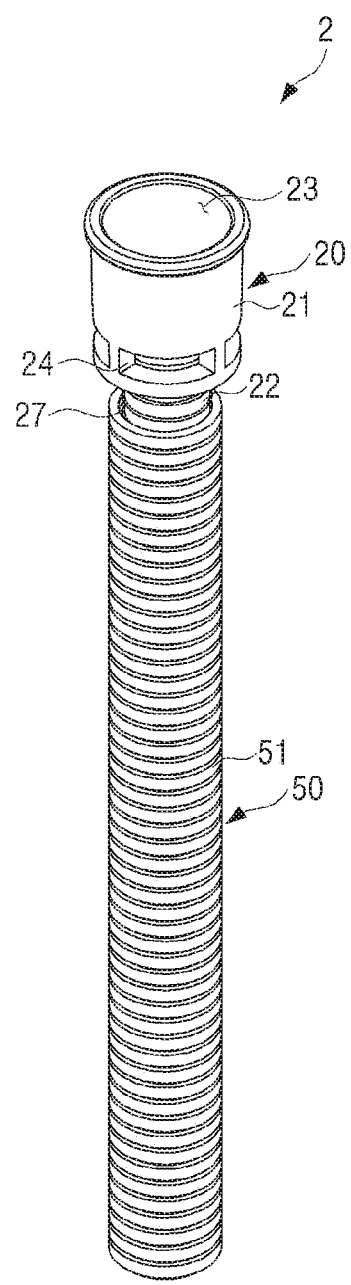
FIG. 11 is a perspective view illustrating a drain hose assembly according to an embodiment of the disclosure.
Figure 12:
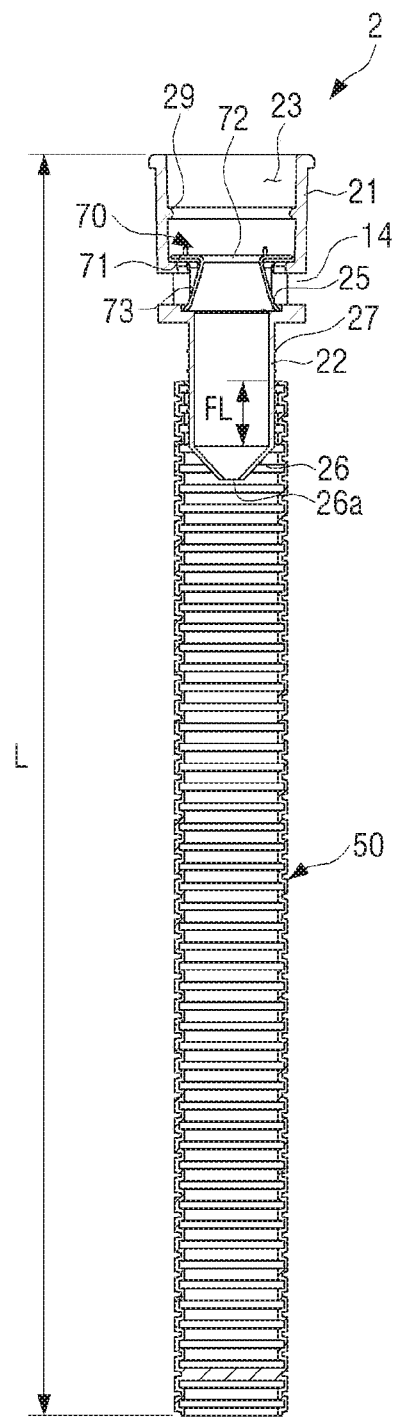
FIG. 12 is a cross-sectional view of the drain hose assembly of FIG. 11.
Figure 13:
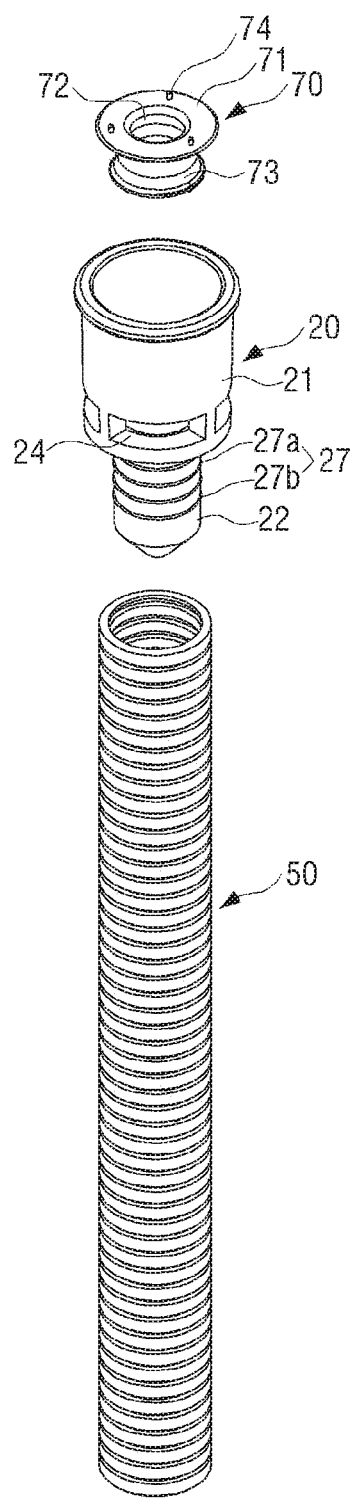
FIG. 13 is an exploded perspective view of the drain hose assembly of FIG. 11.
Figure 14:
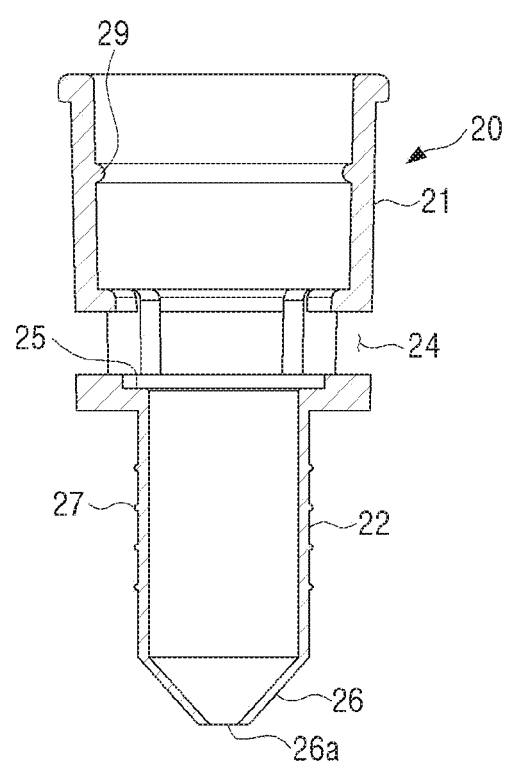
FIG. 14 is a cross-sectional view of a drain cap of the drain hose assembly of FIG. 11.
Figure 15:
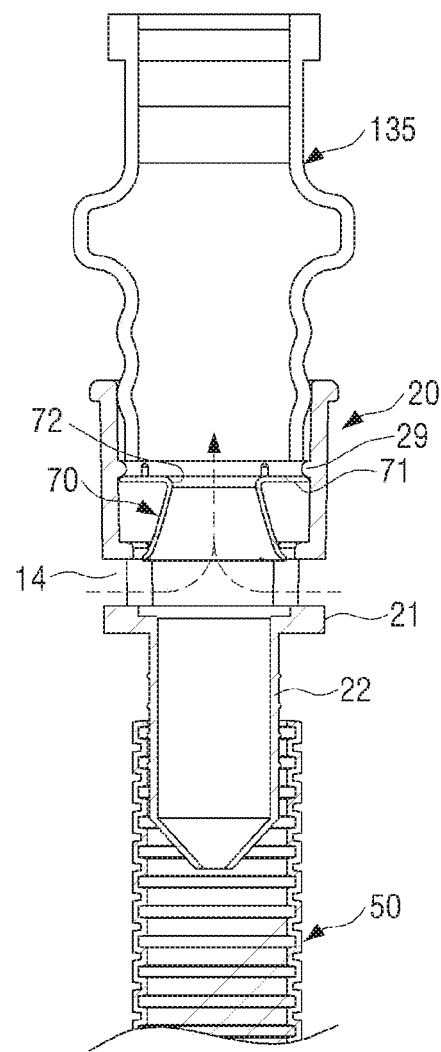
FIG. 15 is a cross-sectional view illustrating a state in which an air adjuster of the drain hose assembly of FIG. 11 is lifted.

FIG. 11 is a perspective view illustrating a drain hose assembly according to an embodiment of the disclosure. FIG. 12 is a cross-sectional view of the drain hose assembly of FIG. 11, and FIG. 13 is an exploded perspective view of the drain hose assembly of FIG. 11. FIG. 14 is a cross-sectional view of a drain cap of the drain hose assembly of FIG. 11, and FIG. 15 is a cross-sectional view illustrating a state in which an air adjuster of the drain hose assembly of FIG. 11 is lifted.

Referring to FIGS. 11 to 15, a drain hose assembly 2 according to an embodiment of the disclosure may include a drain cap 20 and a drain hose 50.

The drain cap 20 is connected to the discharge plug 135 provided on the machine room 140 and limits introduction of air in the machine room 140, that is, external air into the evaporator housing 131 through the discharge plug 135. The drain cap 20 may include an upper cap portion 21 having a housing space 23 into which the discharge plug 135 is inserted, and a lower cap portion 22 extending from a lower end of the upper cap portion 21.

The upper cap portion 21 has a hollow cylinder-like shape and the housing space 23 into which the discharge plug 135 may be inserted is provided in the upper cap portion 21. The upper cap portion 21 may be formed of a moldable elastic material to be able to be fixed to the discharge plug 135. For example, the upper cap portion 21 may be formed of a thermoplastic elastomer (TPE). In case that the upper cap portion 21 is formed of an elastic material such as a TPE, the drain cap 20 may not fall off the discharge plug 135 and a gap between the drain cap 20 and the discharge plug 135 may be sealed at the time of coupling between the upper cap portion 21 and the discharge plug 135 as illustrated in FIG. 15.

A plurality of air holes 24 through which the external air is introduced into the housing space 23 may be provided in an outer circumferential surface of the upper cap portion 21. The plurality of air holes 24 are provided in a lower portion of the upper cap portion 21 that is adjacent to the lower cap portion 22. The plurality of air holes 24 may be formed at predetermined intervals along the outer circumferential surface of the upper cap portion 21.

An air adjuster 70 configured to close the plurality of air holes 24 is installed in the housing space 23 in the upper cap portion 21. A seating portion 25 on which the air adjuster 70 is seated is provided in a lower end of the upper cap portion 21. Accordingly, once the air adjuster 70 is seated on the seating portion 25, the external air may not be introduced into the upper cap portion 21 through the plurality of air holes 24.

The air adjuster 70 is installed to be movable vertically in the housing space 23 of the upper cap portion 21, and may selectively close the plurality of air holes 24 depending on opening and closing of the door 120 installed on a front surface of the storage 111 of the body 110. That is, in case that the door 120 is closed, the air adjuster 70 is seated on the seating portion 25 of the upper cap portion 21 to close the plurality of air holes 24. In case that the door 120 is open, a negative pressure is formed in the storage 111, such that the air adjuster 70 in the upper cap portion 21 is lifted to open the plurality of air holes 24 as illustrated in FIG. 15. Then, the external air may be introduced into the upper cap portion 21 through the plurality of air holes 24. Once the door 120 is closed again, the air adjuster 70 is lowered and seated on the seating portion 25 of the upper cap portion 21 to close the plurality of air holes 24 as illustrated in FIG. 12.

Referring to FIG. 12, the air adjuster 70 includes a lifting plate 71 having a disc shape, and an inclined guide portion 73 extending from a lower portion of the lifting plate 71. A structure of the air adjuster 70 is the same as or similar to that of the air adjuster 70 of the drain hose assembly 1 according to the above-described embodiment, and thus a detailed description thereof will be omitted.

A stopper protrusion 29 limiting the lifting of the air adjuster 70 may be formed in the upper cap portion 21. The stopper protrusion 29 may protrude inward from an inner surface of the upper cap portion 21. An inner diameter of the stopper protrusion 29 is smaller than a diameter of the lifting plate 71 of the air adjuster 70. Therefore, a lifting height of the air adjuster 70 is limited by the stopper protrusion 29 at the time of the lifting of the air adjuster 70.

Further, the stopper protrusion 29 is formed at a position to limit the lifting of the air adjuster 70 in a state in which the air adjuster 70 is lifted and the plurality of air holes 24 of the upper cap portion 21 are thus completely open. Therefore, a lifting position of the air adjuster 70 is limited and the plurality of air holes 24 are completely open, when the door 120 is open and the air adjuster 70 is lifted.

Meanwhile, because the upper cap portion 21 is formed of the elastic material, the air adjuster 70 may be forcibly seated on the seating portion 25 through the stopper protrusion 29.

The lower cap portion 22 extends from the lower end of the upper cap portion 21 and has a hollow cylindrical shape with an outer diameter smaller than an outer diameter of the upper cap portion 21 to be able to be inserted into the drain hose 50. A lower end 26 of the lower cap portion 22 has a cone-like shape to allow the drain hose 50 to be easily fitted, and a discharge port 26a through which the defrost water is discharged is formed in the lower end 26 of the lower cap portion 22. Therefore, the defrost water passing through the upper cap portion 21 may be discharged to the drain hose 50 through the lower cap portion 22.

A plurality of protrusions 27 for fixing the drain hose 50 to prevent the drain hose 50 from being released are formed on an outer circumferential surface of the lower cap portion 22. Referring to FIG. 13, according to the embodiment, the plurality of protrusions 27 of the lower cap portion 22 include a spiral protrusion 27a formed on an upper portion of the lower cap portion 22, and a plurality of ring protrusions 27b formed on a lower portion of the lower cap portion 22. In case that the plurality of protrusions 27 include the spiral protrusion 27a and the ring protrusions 27b as described above, a length L of the drain hose assembly 2, that is, a length from the upper end of the drain cap 20 to a lower end of the drain hose 50 may be adjusted by adjusting a joining length FL of the drain hose 50 joined to the lower cap portion 22. Here, the joining length FL of the drain hose 50 may refer to a contact length between the drain hose 50 and the lower cap portion 22.

Therefore, in case that the length L of the drain hose assembly 2 needs to be large, one end of the drain hose 50 is positioned on the plurality of ring protrusions 27b at the time of joining to make the joining length FL small. In case that the length L of the drain hose assembly 2 needs to be small, one end of the drain hose 50 is positioned on the spiral protrusion 27a at the time of joining to make the joining length FL large. Therefore, the drain hose assembly 2 according to an embodiment of the disclosure may be installed in two types of refrigerators of which the machine rooms 140 have heights h different from each other.

Although the case that the spiral protrusion 27a and the plurality of ring protrusions 27b are formed on the outer circumferential surface of the lower cap portion 22 has been described with reference to FIGS. 11 to 15, the plurality of protrusions 27 are not limited thereto. All of the plurality of protrusions 27 of the lower cap portion 22 may be the spiral protrusion 27a as illustrated in FIG. 9.

In case that all of the plurality of protrusions 27 of the lower cap portion 22 are the spiral protrusion 27a, the length L of the drain hose assembly 2 may be adjusted by adjusting the joining length FL of the drain hose 50 joined to the lower cap portion 22. That is, the length L of the drain hose assembly 2 may be decreased by increasing the joining length FL of the drain hose 50, and the length L of the drain hose assembly 2 may be increased by decreasing the joining length FL of the drain hose 50. In case that the spiral protrusion 27a is formed along the entire length of the lower cap portion 22, the length L of the drain hose assembly 2 may be variously adjusted to two or more values.

The drain hose 50 connects the drain cap 20 and the defrost water tray 150 to each other. One end of the drain hose 50 is joined to the lower cap portion 22 of the drain cap 20, and the other end of the drain hose 50 is joined to the defrost water tray 150. A joining hole into which the other end of the drain hose 50 is inserted may be formed in the defrost water tray 150.

The drain hose 50 may be implemented by a corrugated hose having a circular corrugation 51. Alternatively, the drain hose 50 may be implemented by a corrugated hose having a spiral corrugation 52 as illustrated in FIG. 10.

The drain hose assembly 2 having the above-described structure is installed to connect the discharge plug 135 provided on the upper surface 141 of the machine room 140, and the defrost water tray 150 to each other.

Therefore, once the defrost water is formed on the evaporator 130 due to the defrost operation, the defrost water is introduced into the drain hose assembly 2 through the defrost water collection tank 132, the defrost water hose 133, and the discharge plug 135. The defrost water introduced into the drain hose assembly 2 moves to the lower cap portion 22 through the through-hole 72 of the air adjuster 70 installed in the upper cap portion 21 of the drain cap 20 and is discharged through the discharge port 26a of the lower cap portion 22. The defrost water discharged from the drain cap 20 flows along the drain hose 50 and is collected in the defrost water tray 150.

Further, once the user opens the door 120 of the refrigerator 100, a negative pressure is formed in the storage 111, and as a result, the air adjuster 70 seated on the seating portion 25 in the drain cap 20 is lifted. Here, the lifting of the air adjuster 70 is limited by the stopper protrusion 29 of the upper cap portion 21. Once the air adjuster 70 is lifted and comes into contact with the stopper protrusion 29, the external air is introduced into the drain cap 20 through the plurality of air holes 24 formed in the outer circumferential surface of the drain cap 20. Here, a part of the external air introduced through the plurality of air holes 24 moves along the inclined guide portion 73 of the air adjuster 70 and pressurizes the lifting plate 71 of the air adjuster 70. As a result, the lifted state of the air adjuster 70 may be stably maintained.

The external air introduced into the drain cap 20 is introduced into the storage 111 through the through-hole 72 of the air adjuster 70. As a result, the user may smoothly open the door 120, because a force required to open the door 120 is reduced.

Once the door 120 is closed, the air adjuster 70 in the drain cap 20 is lowered by its own weight and seated on the seating portion 25. Once the air adjuster 70 is seated on the seating portion 25 of the drain cap 20, the plurality of air holes 24 of the drain cap 20 is closed by the air adjuster 70 and the external air is thus not introduced into the drain cap 20. As a result, a decrease in efficiency of the refrigerator due to the external air may be prevented.

Hereinafter, a drain hose assembly 3 according to an embodiment of the disclosure will be described in detail with reference to FIGS. 16 to 20.

Figure 16:
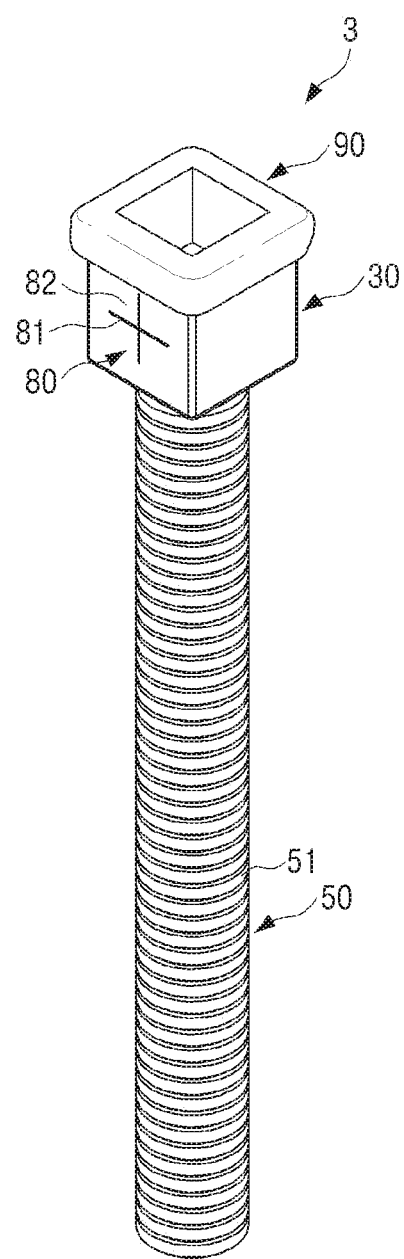
FIG. 16 is a perspective view illustrating a drain hose assembly according to an embodiment of the disclosure.
Figure 17:
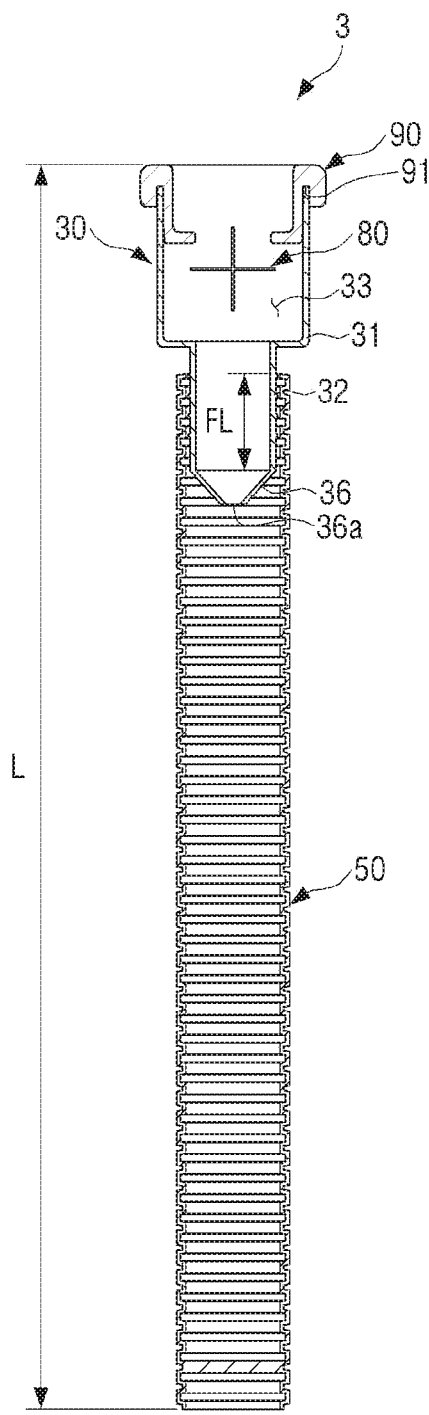
FIG. 17 is a cross-sectional view of the drain hose assembly of FIG. 16.
Figure 18:
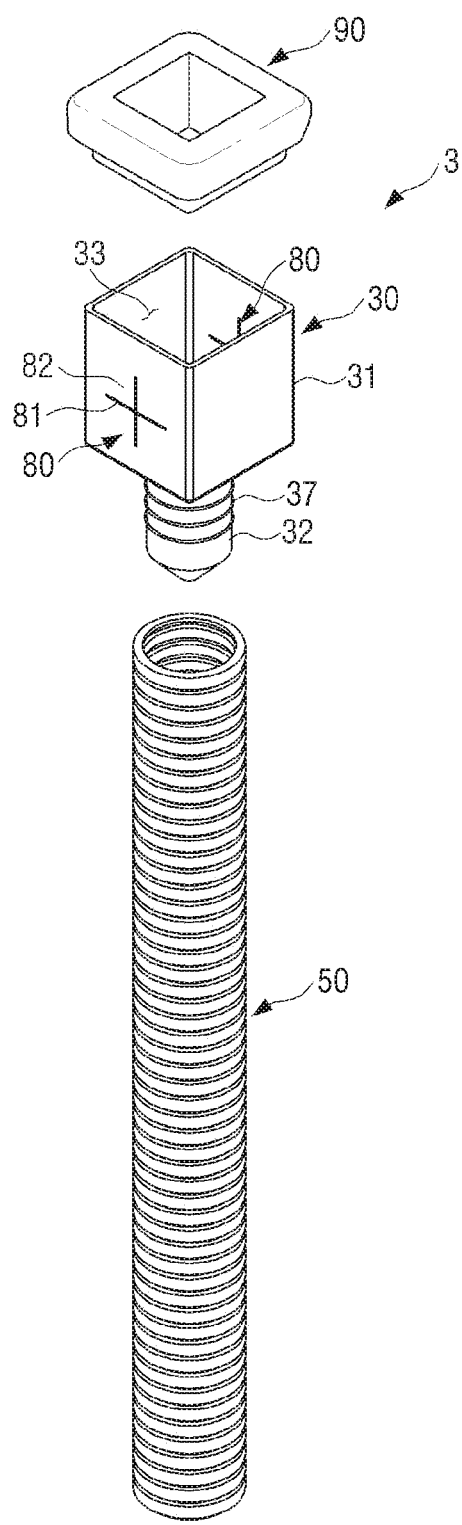
FIG. 18 is an exploded perspective view of the drain hose assembly of FIG. 16.
Figure 19:
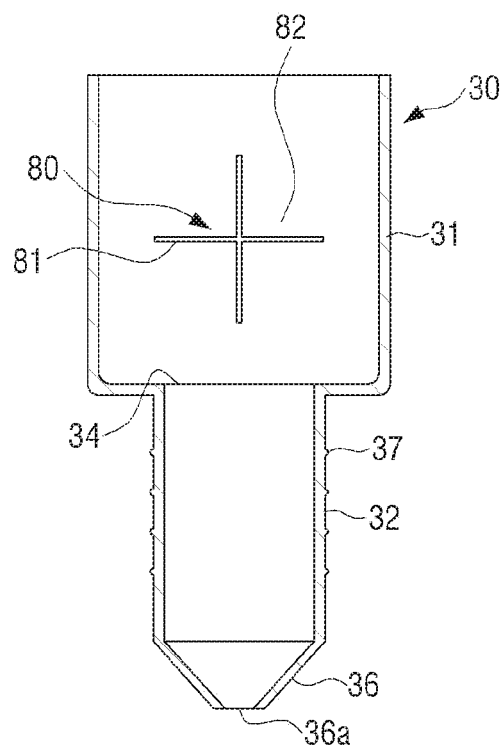
FIG. 19 is a cross-sectional view of a drain cap of the drain hose assembly of FIG. 16.
Figure 20:
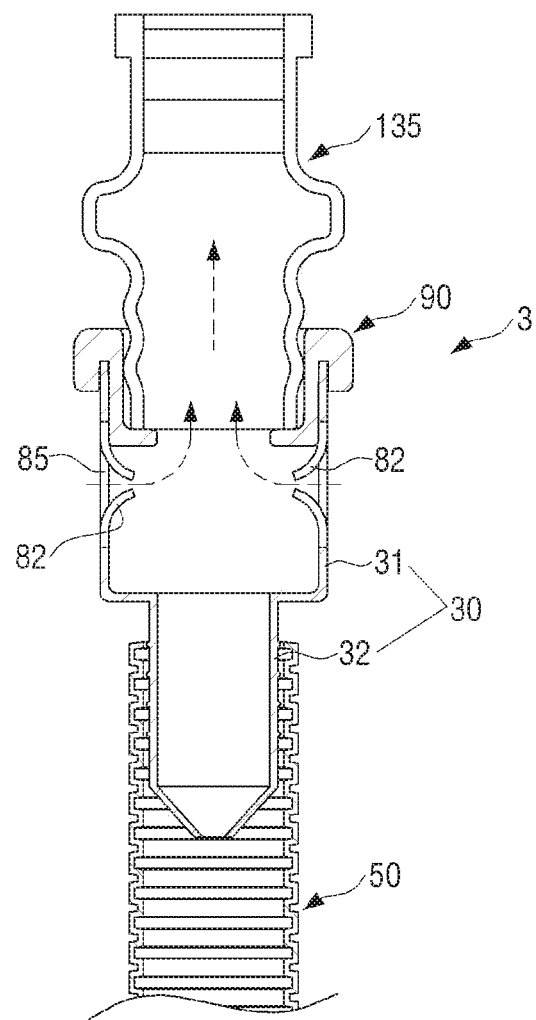
FIG. 20 is a cross-sectional view illustrating a state in which a slit portion of the drain hose assembly of FIG. 16 is open.

FIG. 16 is a perspective view illustrating a drain hose assembly according to an embodiment of the disclosure. FIG. 17 is a cross-sectional view of the drain hose assembly of FIG. 16, and FIG. 18 is an exploded perspective view of the drain hose assembly of FIG. 16. FIG. 19 is a cross-sectional view of a drain cap of the drain hose assembly of FIG. 16, and FIG. 20 is a cross-sectional view illustrating a state in which a slit portion of the drain cap of FIG. 16 is open.

Referring to FIGS. 16 to 20, a drain hose assembly 3 according to an embodiment of the disclosure may include a drain cap 30 and a drain hose 50.

The drain cap 30 is connected to the discharge plug 135 provided on the machine room 140 and limits introduction of air in the machine room 140, that is, external air into the evaporator housing 131 through the discharge plug 135. The drain cap 30 may include an upper cap portion 31 having a housing space 33 into which the discharge plug 135 is inserted, and a lower cap portion 32 extending from a lower end of the upper cap portion 31.

The upper cap portion 31 has a hollow rectangular parallelepiped-like shape and the housing space 33 into which the discharge plug 135 may be inserted is provided in the upper cap portion 31. An upper end of the upper cap portion 31 is open and a lower end of the upper cap portion 31 is closed. A hole 34 communicating with the lower cap portion 32 is formed at the center of a lower end surface of the upper cap portion 31.

A fixing ring 90 for fixing the drain cap 30 to the discharge plug 135 is installed on the upper end of the upper cap portion 31. The fixing ring 90 is positioned between the upper cap portion 31 and the discharge plug 135, and has a rectangular ring shape corresponding to a shape of the upper cap portion 31. A coupling portion 91 into which the upper cap portion 31 may be inserted and coupled is formed in the fixing ring 90. The fixing ring 90 may be formed of a rubber material to fix the drain cap 30 to the discharge plug 135 and seal a gap between the drain cap 30 and the discharge plug 135. Here, the discharge plug 135 may also have a rectangular cross section corresponding to the shape of the upper cap portion 31.

At least one slit portion 80 may be formed in an outer peripheral surface of the upper cap portion 31 of the drain cap 30. The at least one slit portion 80 is formed to be operated depending on opening and closing of the door 120 that opens and closes the storage 111. That is, the at least one slit portion 80 allows the external air to be introduced into the drain cap 30 once the door 120 is open, and blocks the introduction of the external air into the drain cap 30 once the door 120 is closed.

The upper cap portion 31 is formed in a rectangular parallelepiped shape, and thus a side surface of the upper cap portion 31 is flat, and the at least one slit portion 80 is formed in the side surface of the upper cap portion 31. In the embodiment illustrated in FIG. 18, two slit portions 80 are formed in the upper cap portion 31. The two slit portions 80 may be formed in two opposite side surfaces of the upper cap portion 31. As an example, although not illustrated, one slit portion 80 or three or four slit portions 80 may be formed in the upper cap portion 31.

The slit portion 80 may include four slits 81 radially formed at the center of the side surface of the upper cap portion 31 of the drain cap 30, and four covers 82 formed between the four slits 81. A width of each of the four slits 81 is 0.5 to 1.0 mm, and the four covers 82 may be bent with respect to the side surface of the upper cap portion 31.

Therefore, once the door 120 of the refrigerator 100 is open, the four covers 82 are bent toward the inside of the upper cap portion 31 to form a hole 85 in the side surface of the upper cap portion 31 as illustrated in FIG. 20. As a result, the external air may be introduced into the housing space 33 of the upper cap portion 31. Once the door 120 is closed, the four covers 82 are maintained flat. Here, the defrost water is not leaked to the outside at the time of flowing along the drain cap 30, because the slit 81 constituting the slit portion 80 has a width of 0.5 to 1.0 mm. Further, an amount of external air introduced into the drain cap 30 through the slit 81 is also very small. Therefore, it is possible to limit the introduction of the external air into the evaporator housing 131 through the slit portion 80 formed in the drain cap 30.

According to the embodiment, the slit portion 80 includes four slits 81 and four covers 82, but a structure of the slit portion 80 is not limited thereto. That is, the number of slits 81 and the number of covers 82 constituting the slit portion 80 are not limited thereto.

Figure 21:
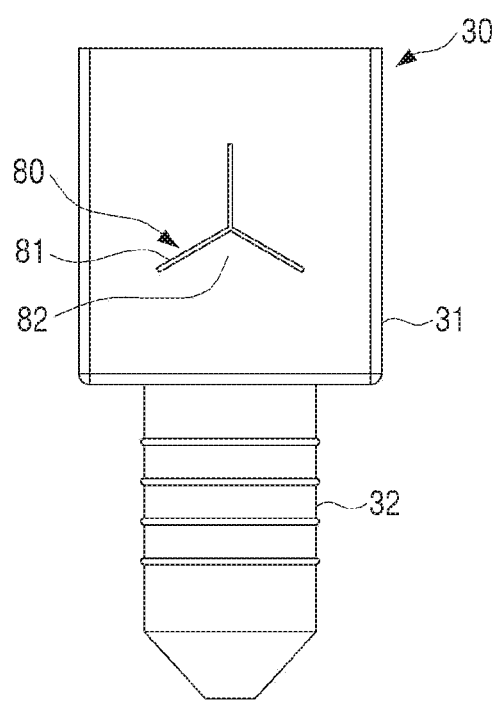
FIG. 21 is a view illustrating an example of a slit portion of a drain cap.

The slit portion 80 may also include three slits 81 and three covers 82 as illustrated in FIG. 21. Specifically, the slit portion 80 may include three slits 81 radially formed at the center of the side surface of the upper cap portion 31 of the drain cap 30, and three covers 82 formed between the three slits 81. Here, a width of each of the slits 81 may be 0.5 to 1.0 mm. For reference, FIG. 21 is a view illustrating an example of the slit portion 80 of the drain cap 30.

In addition, although not illustrated, the slit portion 80 may also be configured to include five or more slits 81 and five or more covers 82. That is, the slit portion 80 may include at least three slits 81 radially formed at the center of one side surface of the upper cap portion 31 of the drain cap 30, and at least three covers 82 formed between the at least three slits 81.

Although the case that the upper cap portion 31 has a hollow rectangular parallelepiped shape has been illustrated and described above, the shape of the upper cap portion 31 is not limited thereto. As an example, the upper cap portion 31 may have a hollow cylindrical shape. In this case, an outer circumferential surface of the upper cap portion 31 may have a flat surface portion to form the slit portion 80.

The lower cap portion 32 extends from the lower end of the upper cap portion 31 and has a hollow cylindrical shape with an outer diameter smaller than a length of one side surface of the upper cap portion 31 to be able to be inserted into the drain hose 50. A lower end 36 of the lower cap portion 32 has a cone-like shape to allow the drain hose 50 to be easily fitted, and a discharge port 36a through which the defrost water is discharged is formed in the lower end 36 of the lower cap portion 32. Therefore, the defrost water passing through the upper cap portion 31 may be discharged to the drain hose 50 through the lower cap portion 32.

A plurality of protrusions 37 for fixing the drain hose 50 to prevent the drain hose 50 from being released are formed on an outer circumferential surface of the lower cap portion 32. Referring to FIG. 18, according to the embodiment, the plurality of protrusions 37 of the lower cap portion 32 are a plurality of ring protrusions. In case that the plurality of protrusions 37 are ring protrusions as described above, a length L of the drain hose assembly 3, that is, a length from the upper end of the drain cap 30 to a lower end of the drain hose 50 may be adjusted by adjusting a joining length FL of the drain hose 50 joined to the lower cap portion 32. Here, the joining length FL of the drain hose 50 may refer to a contact length between the drain hose 50 and the lower cap portion 32.

Therefore, in case that the length L of the drain hose assembly 3 needs to be large, the drain hose 50 is press-fitted onto the plurality of ring protrusions to be slightly fitted at the time of joining to make the joining length FL small. In case that the length L of the drain hose assembly 3 needs to be small, one end of the drain hose 50 is press-fitted onto the plurality of ring protrusions to be deeply fitted at the time of joining to make the joining length FL large. Therefore, the drain hose assembly 3 according to an embodiment of the disclosure may be installed in two or more types of refrigerators of which the machine rooms 140 have heights h different from each other.

Although the case that the plurality of ring protrusions 37 are formed on the outer circumferential surface of the lower cap portion 32 has been described with reference to FIGS. 16 to 20, the plurality of protrusions 37 are not limited thereto. The plurality of protrusions 37 of the lower cap portion 32 may include a spiral protrusion formed on an upper portion of the lower cap portion 32, and a plurality of ring protrusions formed on a lower portion of the lower cap portion 32 (see FIG. 5). Alternatively, all of the plurality of protrusions 37 may be a spiral protrusion (see FIG. 9).

In case that all of the plurality of protrusions 37 of the lower cap portion 32 are the spiral protrusion, the length L of the drain hose assembly 3 may be adjusted by adjusting the joining length FL of the drain hose 50 joined to the lower cap portion 32. That is, the length L of the drain hose assembly 3 may be decreased by increasing the joining length FL of the drain hose 50, and the length L of the drain hose assembly 3 may be increased by decreasing the joining length FL of the drain hose 50. In case that the spiral protrusion 37a is formed along the entire length of the lower cap portion 32, the length L of the drain hose assembly 3 may be variously adjusted to two or more values.

The drain hose 50 connects the drain cap 30 and the defrost water tray 150 to each other. One end of the drain hose 50 is joined to the lower cap portion 32 of the drain cap 30, and the other end of the drain hose 50 is joined to the defrost water tray 150. A joining hole into which the other end of the drain hose 50 is inserted may be formed in the defrost water tray 150.

The drain hose 50 may be implemented by a corrugated hose having a circular corrugation 51. Alternatively, the drain hose 50 may be implemented by a corrugated hose having a spiral corrugation 52 as illustrated in FIG. 10.

The drain hose assembly 3 having the above-described structure is installed to connect the discharge plug 135 provided on the upper surface 141 of the machine room 140, and the defrost water tray 150 to each other.

Therefore, once the defrost water is formed on the evaporator 130 due to the defrost operation, the defrost water is introduced into the drain hose assembly 3 through the defrost water collection tank 132, the defrost water hose 133, and the discharge plug 135. The defrost water introduced into the drain hose assembly 3 moves to the lower cap portion 32 through the upper cap portion 31 of the drain cap 30 and is discharged through the discharge port 36a of the lower cap portion 32. The defrost water discharged from the drain cap 30 flows along the drain hose 50 and is collected in the defrost water tray 150.

Further, once the user opens the door 120 of the refrigerator 100, a negative pressure is formed in the storage 111, and as a result, the plurality of covers 82 of the slit portion 80 formed in the upper cap portion 31 of the drain cap 30 are bent toward the inside of the drain cap 30 to form the hole 85 having a substantially circular shape as illustrated in FIG. 20. Once the plurality of covers 82 of the slit portion 80 are bent toward the inside of the drain cap 30, the external air is introduced into the drain cap 30 through the hole 85 formed in the outer circumferential surface of the drain cap 30. Here, the external air introduced into the drain cap 30 through the hole 85 formed by the plurality of covers 82 of the slit portion 80 is introduced into the storage 111. As a result, the user may smoothly open the door 120, because a force required to open the door 120 is reduced.

Once the door 120 is closed, the plurality of covers 82 of the slit portion 80 of the drain cap 30 are unbent to close the hole 85. Once the plurality of covers 82 of the slit portion 80 are unbent, the hole 85 of the drain cap 30 is closed. Therefore, the external air is not introduced into the drain cap 30. As a result, a decrease in efficiency of the refrigerator due to the external air may be prevented.

Hereinafter, a drain hose assembly 4 according to an embodiment of the disclosure will be described in detail with reference to FIGS. 22 to 28.

Figure 22:
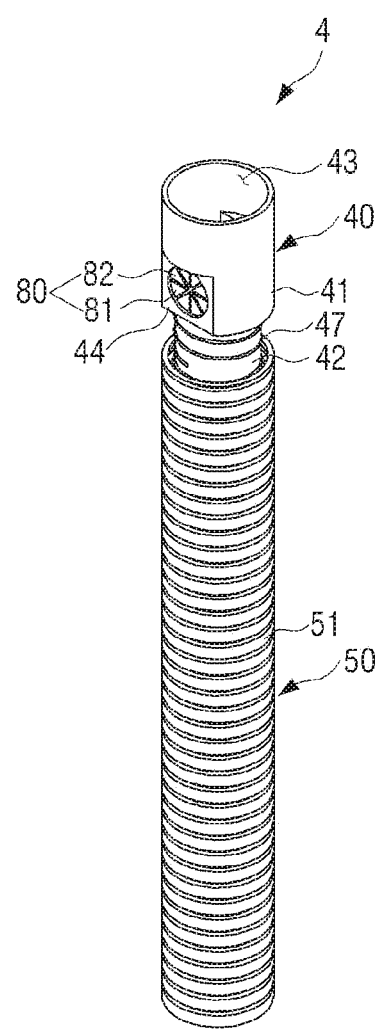
FIG. 22 is a perspective view illustrating a drain hose assembly according to an embodiment of the disclosure.
Figure 23:
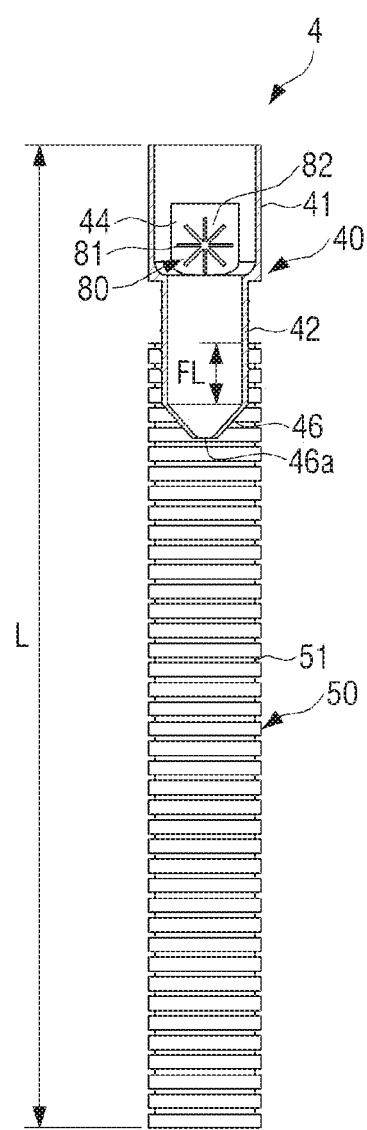
FIG. 23 is a cross-sectional view of the drain hose assembly of FIG. 22.
Figure 24:
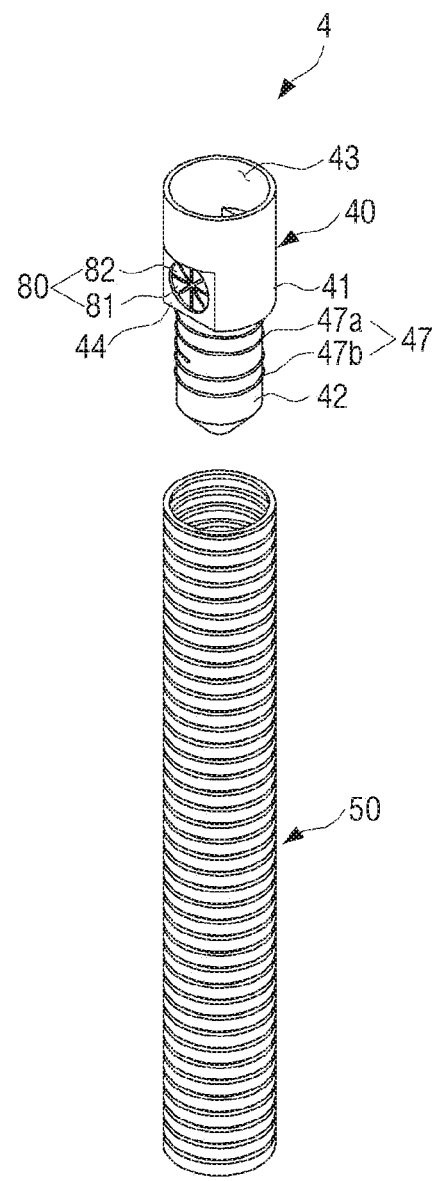
FIG. 24 is an exploded perspective view of the drain hose assembly of FIG. 22.
Figure 25:
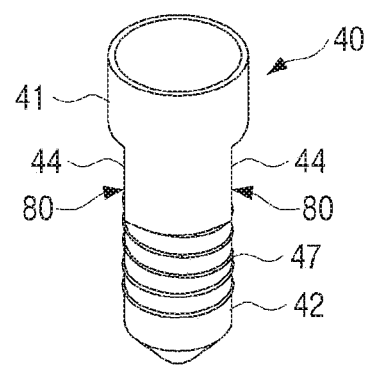
FIG. 25 is a perspective view of a drain cap of the drain hose assembly of FIG. 22.
Figure 26:
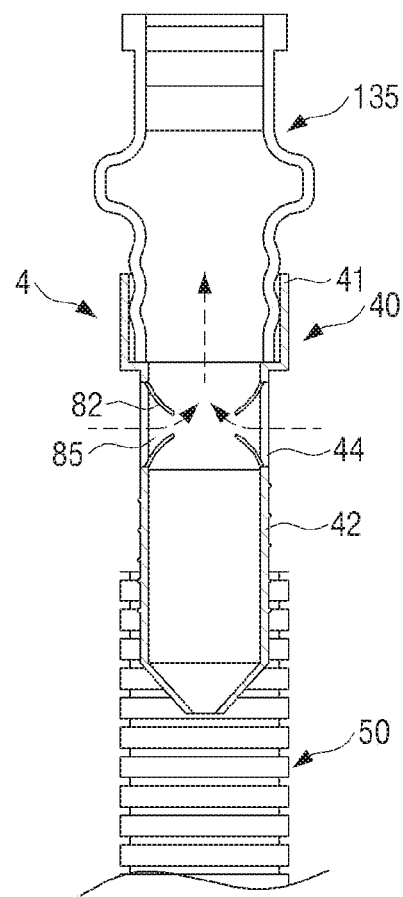
FIG. 26 is a cross-sectional view illustrating a state in which a slit portion of the drain hose assembly of FIG. 22 is open.

FIG. 22 is a perspective view illustrating a drain hose assembly according to an embodiment of the disclosure. FIG. 23 is a cross-sectional view of the drain hose assembly of FIG. 22, and FIG. 24 is an exploded perspective view of the drain hose assembly of FIG. 22. FIG. 25 is a perspective view of a drain cap of the drain hose assembly of FIG. 22, and FIG. 26 is a cross-sectional view illustrating a state in which a slit portion of the drain hose assembly of FIG. 22 is open.

Referring to FIGS. 22 to 26, the drain hose assembly 4 according to an embodiment of the disclosure may include a drain cap 40 and a drain hose 50.

The drain cap 40 is connected to the discharge plug 135 provided on the machine room 140 and limits introduction of air in the machine room 140, that is, external air into the evaporator housing 131 through the discharge plug 135. The drain cap 40 may include an upper cap portion 41 having a housing space 43 into which the discharge plug 135 is inserted, and a lower cap portion 42 extending from a lower end of the upper cap portion 41 and to which the drain hose 50 is joined.

The upper cap portion 41 has a hollow cylinder-like shape and the housing space 43 into which the discharge plug 135 may be inserted is provided in the upper cap portion 41. The upper cap portion 41 may be formed of a moldable elastic material to be able to be fixed to the discharge plug 135. For example, the upper cap portion 41 may be formed of a thermoplastic elastomer (TPE). In case that the upper cap portion 41 is formed of an elastic material such as a TPE, the drain cap 40 may not fall off the discharge plug 135 and a gap between the drain cap 40 and the discharge plug 135 may be sealed at the time of coupling between the upper cap portion 41 and the discharge plug 135.

At least one slit portion 80 may be formed in an outer circumferential surface of the upper cap portion 41 of the drain cap 40. The at least one slit portion 80 is formed to be operated depending on opening and closing of the door 120 that opens and closes the storage 111. That is, the at least one slit portion 80 allows the external air to be introduced into the drain cap 40 once the door 120 is open, and blocks the introduction of the external air into the drain cap 40 once the door 120 closed.

The outer circumferential surface of the upper cap portion 41 may have at least one flat surface portion 44 to form at least one slit portion 80. As illustrated in FIG. 25, according to the embodiment, two flat surface portions 44 are formed in the upper cap portion 41. The two flat surface portions 44 may be formed to face each other. Accordingly, according to the embodiment, two slit portions 80 are formed in the upper cap portion 41.

Although not illustrated, one flat surface portion 44, or three or four flat surface portions 44 may be formed in the outer circumferential surface of the upper cap portion 41. The number of slit portions 80 may correspond to the number of flat surface portions 44, for example, the number of slit portions 80 may be one, three, or four.

The slit portion 80 may include eight slits 81 radially formed at the center of the flat surface portion 44 of the outer circumferential surface of the upper cap portion 41 of the drain cap 40, and eight covers 82 formed between the eight slits 81 as illustrated in FIGS. 22 to 24. A width of each of the eight slits 81 is 0.5 to 1.0 mm, and the eight covers 82 may be bent with respect to the flat surface portion 44 of the upper cap portion 41.

Therefore, once the door 120 of the refrigerator 100 is open, the eight covers 82 are bent toward the inside of the upper cap portion 41 to form a hole 85, and the external air may be introduced into the housing space 43 of the upper cap portion 41 through the hole 85. Once the door 120 is closed, the eight covers 82 are maintained flat. Here, the defrost water is not leaked to the outside at the time of flowing along the drain cap 40, because the slit 81 of the slit portion 80 has a width of 0.5 to 1.0 mm. Further, an amount of external air introduced into the drain cap 40 through the slits 81 is also very small. Therefore, it is possible to limit the introduction of the external air into the evaporator housing 131 through the slit portion 80 formed in the drain cap 40.

According to the embodiment, the slit portion 80 includes eight slits 81 and eight covers 82, but a structure of the slit portion 80 is not limited thereto. The number of slits 81 and the number of covers 82 constituting the slit portion 80 are not limited thereto.

Figure 27:
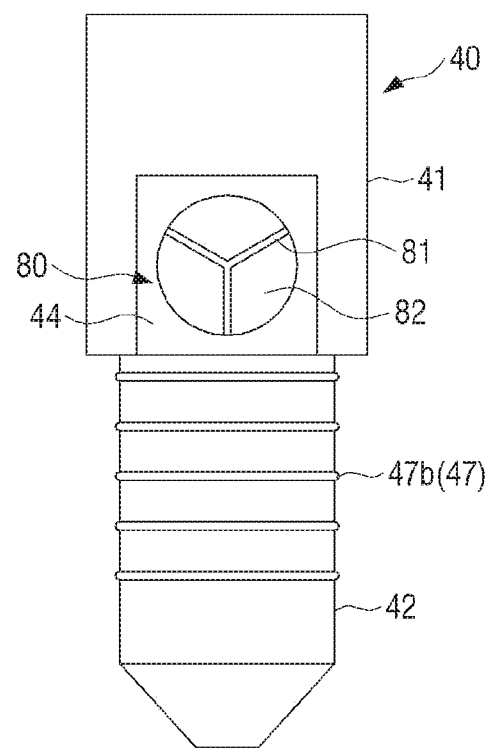
FIG. 27 is a perspective view illustrating an example of a drain cap used in the drain hose assembly of FIG. 22.

The slit portion 80 may also include three slits 81 and three covers 82 as illustrated in FIG. 27. Specifically, the slit portion 80 may include three slits 81 radially formed from the center of the flat surface portion 44 of the upper cap portion 41 of the drain cap 40, and three covers 82 formed between the three slits 81. Here, a width of each of the slits 81 may be 0.5 to 1.0 mm. For reference, FIG. 27 is a view illustrating an example of the slit portion 80 of the drain cap 40.

Figure 28:
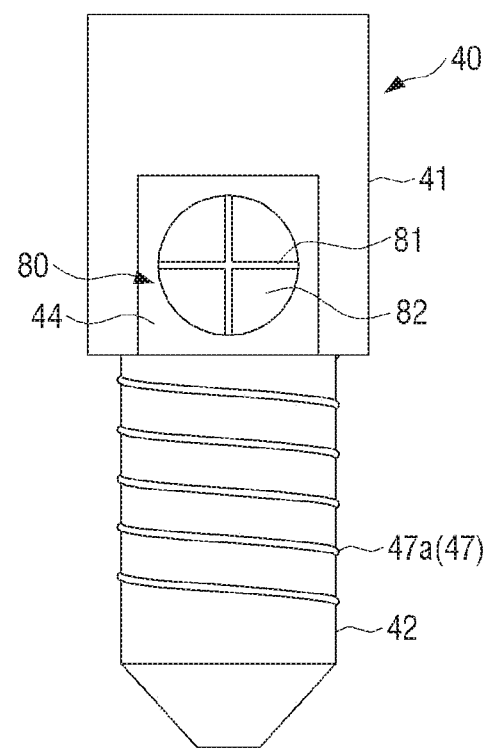
FIG. 28 is a perspective view illustrating an example of the drain cap used in the drain hose assembly of FIG. 22.

Further, the slit portion may also include four slits 81 and four covers 82 as illustrated in FIG. 28. Specifically, the slit portion 80 may include four slits 81 radially formed from the center of the flat surface portion 44 of the upper cap portion 41 of the drain cap 40, and four covers 82 formed between the four slits 81. Here, a width of each of the slits 81 may be 0.5 to 1.0 mm. For reference, FIG. 28 is a view illustrating an example of the slit portion 80 of the drain cap 40.

Although not illustrated, the slit portion 80 may also be configured to include five, six, seven, or nine or more slits 81 and five, six, seven, or nine or more covers 82. In other words, the slit portion 80 may include at least three slits 81 radially formed from the center of the flat surface portion 44 of the upper cap portion 41 of the drain cap 40, and at least three covers 82 formed between the at least three slits 81.

The lower cap portion 42 extends from the lower end of the upper cap portion 41 and has a hollow cylindrical shape with an outer diameter smaller than an outer diameter of the upper cap portion 41. A lower end 46 of the lower cap portion 42 has a cone-like shape to allow the drain hose 50 to be easily inserted, and a discharge port 46a through which the defrost water is discharged is formed in the lower end 46 of the lower cap portion 42. Therefore, the defrost water passing through the upper cap portion 41 may be discharged to the drain hose 50 through the lower cap portion 42.

A plurality of protrusions 47 for fixing the drain hose 50 to prevent the drain hose 50 from being released are formed on an outer circumferential surface of the lower cap portion 42. Referring to FIG. 24, according to the embodiment, the plurality of protrusions 47 of the lower cap portion 42 include a spiral protrusion 47a formed on an upper portion of the lower cap portion 42, and a plurality of ring protrusions 47b formed on a lower portion of the lower cap portion 42. In case that the plurality of protrusions 47 include the spiral protrusion 47a and the ring protrusions 47b as described above, a length L of the drain hose assembly 4, that is, a length from the upper end of the drain cap 40 to a lower end of the drain hose 50 may be adjusted by adjusting a joining length FL of the drain hose 50 joined to the lower cap portion 42. Here, the joining length FL of the drain hose 50 may refer to a contact length between the drain hose 50 and the lower cap portion 42.

Therefore, in case that the length L of the drain hose assembly 4 needs to be large, one end of the drain hose 50 is positioned on the plurality of ring protrusions 47b at the time of joining to make the joining length FL small as illustrated in FIG. 22. In case that the length L of the drain hose assembly 4 needs to be small, one end of the drain hose 50 passes through the plurality of ring protrusions 47b and is positioned on the spiral protrusion 47a at the time of joining to make the joining length FL large. Therefore, the drain hose assembly 4 according to an embodiment of the disclosure may be installed in two types of refrigerators of which the machine rooms 140 have heights h different from each other.

Although the case that the spiral protrusion 47a and the plurality of ring protrusions 47b are formed on the outer circumferential surface of the lower cap portion 42 has been described with reference to FIGS. 22 to 25, the plurality of protrusions 47 are not limited thereto. As an example, all of the plurality of protrusions 47 of the lower cap portion 42 may be the spiral protrusion 47a as illustrated in FIG. 28.

In case that all of the plurality of protrusions 47 of the lower cap portion 42 are the spiral protrusion 47a, the length L of the drain hose assembly 4 may be adjusted by adjusting the joining length FL of the drain hose 50 joined to the lower cap portion 42. That is, the length L of the drain hose assembly 4 may be decreased by increasing the joining length FL of the drain hose 50, and the length L of the drain hose assembly 4 may be increased by decreasing the joining length FL of the drain hose 50. In case that the spiral protrusion 47a is formed along the entire length of the lower cap portion 42, the length L of the drain hose assembly 4 may be variously adjusted to two or more values.

As an example, the plurality of protrusions 47 of the lower cap portion 42 may be the plurality of ring protrusions 47b as illustrated in FIG. 27. In case that the plurality of protrusions 47 of the lower cap portion 42 are the plurality of ring protrusions 47b as described above, the length L of the drain hose assembly 4 may be adjusted by adjusting the joining length FL of the drain hose 50 joined to the lower cap portion 42.

The drain hose 50 connects the drain cap 40 and the defrost water tray 150 to each other. One end of the drain hose 50 is joined to the lower cap portion 42 of the drain cap 40, and the other end of the drain hose 50 is joined to the defrost water tray 150. A joining hole into which the other end of the drain hose 50 is inserted may be formed in the defrost water tray 150.

The drain hose 50 may be implemented by a corrugated hose having a circular corrugation 51. Alternatively, the drain hose 50 may be implemented by a corrugated hose having a spiral corrugation 52 as illustrated in FIG. 10.

The drain hose assembly 4 having the above-described structure is installed to connect the discharge plug 135 provided on the upper surface 141 of the machine room 140, and the defrost water tray 150 to each other.

Therefore, once the defrost water is formed on the evaporator 130 due to the defrost operation, the defrost water is introduced into the drain hose assembly 4 through the defrost water collection tank 132, the defrost water hose 133, and the discharge plug 135. The defrost water introduced into the drain hose assembly 4 moves to the lower cap portion 42 through the upper cap portion 41 of the drain cap 40 and is discharged through the discharge port 46a of the lower cap portion 42. The defrost water discharged from the drain cap 40 flows along the drain hose 50 and is collected in the defrost water tray.

Further, once the user opens the door 120 of the refrigerator 100, a negative pressure is formed in the storage 111, and as a result, the eight covers 82 of the slit portion 80 formed in the upper cap portion 41 of the drain cap 40 are bent toward the inside of the drain cap 40 to form the hole 85 having a substantially circular shape as illustrated in FIG. 26. Once the eight covers 82 of the slit portion 80 are bent toward the inside of the drain cap 40, the external air is introduced into the drain cap 40 through the hole 85 formed in the flat surface portion 44 of the drain cap 40. Here, the external air introduced into the drain cap 40 through the hole 85 formed by the eight covers 82 of the slit portion 80 is introduced into the storage 111. As a result, the user may smoothly open the door 120, because a force required to open the door 120 is reduced.

Once the door 120 is closed, the plurality of covers 82 of the slit portion 80 of the drain cap 40 are unbent to stop the hole 85. Once the plurality of covers 82 of the slit portion 80 are unbent, the hole 85 of the drain cap 40 is closed. Therefore, the external air is not introduced into the drain cap 40. As a result, a decrease in efficiency of the refrigerator 100 due to the external air may be prevented.

The drain hose assembly according to an embodiment of the disclosure having the above-described structure has a simple structure, and thus assembling of the drain hose assembly into the refrigerator is easy. As a result, component cost and assembly cost for the refrigerator may be reduced, which is advantageous.

Further, the length of the drain hose assembly according to an embodiment of the disclosure may be adjusted, and thus the drain hose assembly may be used in various types of refrigerators. As a result, management of components in a refrigerator manufacturing factory is easy.

Hereinabove, the disclosure has been described for illustrative purpose. It is to be understood that terms used herein are provided to describe the disclosure rather than limiting the disclosure. Various modifications and alternations of the disclosure may be made according to the contents described above. Therefore, the disclosure may be freely practiced without departing from the scope of the claims unless additionally mentioned.

What is claimed is:

1. A refrigerator comprising:
    a storage compartment;

an evaporator configured to cool the storage compartment;
an evaporator housing configured to house the evaporator;
a machine room including a discharge plug that is connected to the evaporator housing and configured to discharge defrost water from the evaporator housing to the machine room;
a defrost water tray installed in the machine room and configured to collect the defrost water discharged from the evaporator housing through the discharge plug; and
a drain hose assembly connecting the discharge plug to the defrost water tray to transfer the defrost water from the discharge plug to the defrost water tray,
wherein the drain hose assembly includes,
    a drain cap connected to the discharge plug and configured to limit an introduction of air into the evaporator housing, and
    a drain hose having a first end connected to the drain cap and a second end connected to the defrost water tray, and
wherein
the drain cap includes an upper cap portion having a housing space configured to receive the discharge plug, and a lower cap portion extending from a lower end of the upper cap portion to be inserted into the drain hose, and
a length of the drain hose assembly is adjustable by adjusting an insertion amount of the lower cap portion into the drain hose.

2. The refrigerator as claimed in claim 1, wherein the lower end of the upper cap portion includes a hollow cylindrical shape with an outer diameter smaller than that of an outer diameter of the upper cap portion.

3. The refrigerator as claimed in claim 2, wherein an outer circumferential surface of the lower cap portion includes a spiral protrusion configured to be inserted into the drain hose.

4. The refrigerator as claimed in claim 2, further comprising:
a door configured to open and close the storage compartment; and
an air adjuster installed to be movable vertically in the housing space and configured to selectively close a plurality of air holes through which the air is introduced into the evaporator housing depending on opening and closing of the door,
wherein the plurality of air holes are formed in an outer circumferential surface of the upper cap portion of the drain cap.

5. The refrigerator as claimed in claim 4, further comprising a fixing ring provided on the upper cap portion of the drain cap and configured to fix the drain cap to the discharge plug and to limit a movement of the air adjuster in a direction opening the plurality of air holes.

6. The refrigerator as claimed in claim 4, wherein the drain cap is formed of a moldable elastic material, and a stopper protrusion is formed on an inner surface of the upper cap portion to limit a movement of the air adjuster in a direction opening the plurality of air holes.

7. The refrigerator as claimed in claim 2, further comprising:
a door configured to open and close the storage compartment; and
at least one slit portion provided in an outer circumferential surface of the upper cap portion of the drain cap and configured to be operated depending on opening and closing of the door.

8. The refrigerator as claimed in claim 7, wherein the at least one slit portion is provided in at least one flat surface portion formed in the outer circumferential surface of the upper cap portion.

9. The refrigerator as claimed in claim 8, wherein the at least one slit portion includes:
at least three slits radially formed from the center of the at least one flat surface portion, and
at least three covers respectively formed between the at least three slits, and the at least three covers are bent toward an inside of the upper cap portion based on the door being open to allow the air to be introduced into the evaporator housing.

10. The refrigerator as claimed in claim 9, wherein a width of each of the at least three slits is from approximately 0.5 mm to approximately 1.0 mm.

11. The refrigerator as claimed in claim 7, further comprising a fixing ring provided on the upper cap portion of the drain cap and fixing the drain cap to the discharge plug.

12. The refrigerator as claimed in claim 7, wherein the drain cap is formed of a moldable elastic material.

13. The refrigerator as claimed in claim 2, wherein the drain hose includes a corrugated hose having a circular corrugation or a spiral corrugation.

14. The refrigerator as claimed in claim 1, further comprising:
a door configured to open and close the storage compartment; and
an air adjuster installed to be movable vertically in the housing space and configured to selectively close a plurality of air holes through which the air is introduced into the evaporator housing depending on opening and closing of the door,
wherein
the plurality of air holes are formed in an outer circumferential surface of the upper cap portion of the drain cap, and
the air adjuster includes an inclined portion having a diameter which decreases in a direction from the lower cap portion to the upper cap portion.

15. A refrigerator, comprising:
a storage compartment;
an evaporator configured to cool the storage compartment;
an evaporator housing configured to house the evaporator;
a machine room including a discharge plug that is connected to the evaporator housing and configured to discharge defrost water from the evaporator housing to the machine room;
a defrost water tray installed in the machine room and configured to collect the defrost water discharged from the evaporator housing through the discharge plug; and
a drain hose assembly connecting the discharge plug to the defrost water tray to transfer the defrost water from the discharge plug to the defrost water tray,
wherein the drain hose assembly includes,
    a drain cap connected to the discharge plug and configured to limit an introduction of air into the evaporator housing, and
    a drain hose having a first end connected to the drain cap and a second end connected to the defrost water tray, and
wherein
a length of the drain hose assembly is adjustable by adjusting an insertion amount of the drain cap into the drain hose, the drain cap includes an upper cap portion having a housing space configured to receive the discharge plug, and a lower cap portion extending from a lower end of the upper cap portion to be inserted into the drain hose, an outer circumferential surface of the lower cap portion includes a spiral protrusion configured to be inserted into the drain hose, and the lower cap portion further includes a plurality of ring protrusions formed below the spiral protrusion on the outer circumferential surface of the lower cap portion.

16. The refrigerator as claimed in claim 15, wherein the first end of the drain hose is positioned on the plurality of ring protrusions to increase the length of the drain hose assembly, and the first end of the drain hose is positioned on the spiral protrusion to decrease the length of the drain hose assembly.

17. A drain hose assembly for a refrigerator including a storage compartment, an evaporator configured to cool the storage compartment, an evaporator housing configured to house the evaporator, a machine room including a discharge plug that is connected to the evaporator housing and configured to discharge defrost water from the evaporator housing to the machine room, and a defrost water tray installed in the machine room and configured to collect the defrost water discharged from the evaporator housing through the discharge plug, the drain hose assembly connecting the discharge plug to the defrost water tray to transfer the defrost water from the discharge plug to the defrost water tray and comprising:

a drain cap connectable to the discharge plug and configured to limit an introduction of air into the evaporator housing; and a drain hose having a first end connected to the drain cap and a second end connectable to the defrost water tray, wherein the drain cap includes an upper cap portion having a housing space configured to receive the discharge plug, and a lower cap portion extending from a lower end of the upper cap portion to be inserted into the drain hose, and a length of the drain hose assembly is adjustable by adjusting an insertion amount of the lower cap portion into the drain hose.

18. The drain hose assembly as claimed in claim 17, wherein the lower end of the upper cap portion includes a hollow cylindrical shape with an outer diameter smaller than that of an outer diameter of the upper cap portion, an outer circumferential surface of the lower cap portion includes a spiral protrusion configured to be inserted into the drain hose, and the lower cap portion further includes a plurality of ring protrusions formed below the spiral protrusion on the outer circumferential surface of the lower cap portion.

19. The drain hose assembly as claimed in claim 18, further comprising an air adjuster installed to be movable vertically in the housing space and configured to selectively close a plurality of air holes through which the air is introduced into the evaporator housing depending on opening and closing of the door, wherein the plurality of air holes are formed in an outer circumferential surface of the upper cap portion of the drain cap.

20. The drain hose assembly as claimed in claim 18, further comprising at least one slit portion which is formed in at least one flat surface portion formed in an outer circumferential surface of the upper cap portion of the drain cap, and is open and closed depending on opening and closing of the door.

\* \* \* \* \*